(12) United States Patent
Wang

(10) Patent No.: US 9,584,804 B2
(45) Date of Patent: Feb. 28, 2017

(54) CODING SEI NAL UNITS FOR VIDEO CODING

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 13/802,005

(22) Filed: Mar. 13, 2013

(65) Prior Publication Data

US 2014/0016707 A1    Jan. 16, 2014

Related U.S. Application Data

(60) Provisional application No. 61/670,066, filed on Jul. 10, 2012.

(51) Int. Cl.
| | | |
|---|---|---|
| *H04N 19/00* | (2014.01) | |
| *H04N 19/50* | (2014.01) | |
| *H04N 19/70* | (2014.01) | |
| *H04N 19/46* | (2014.01) | |
| *H04N 19/31* | (2014.01) | |
| *H04N 19/573* | (2014.01) | |

(52) U.S. Cl.
CPC ....... *H04N 19/00569* (2013.01); *H04N 19/31* (2014.11); *H04N 19/46* (2014.11); *H04N 19/573* (2014.11); *H04N 19/70* (2014.11)

(58) Field of Classification Search
CPC .. H04N 7/50; H04N 7/26335; H04N 7/26707; H04N 7/26946; H04N 7/26244
See application file for complete search history.

(56) References Cited

U.S. PATENT DOCUMENTS

| | | |
|---|---|---|
| 7,532,670 B2 | 5/2009 | Viscito et al. |
| 8,160,153 B2 | 4/2012 | Viscito et al. |
| 2003/0156652 A1 | 8/2003 | Wise et al. |
| 2004/0005007 A1 | 1/2004 | Viscito et al. |
| 2004/0017851 A1 | 1/2004 | Haskell et al. |
| 2004/0146109 A1 | 7/2004 | Kondo et al. |
| 2005/0086276 A1 | 4/2005 | Masuno et al. |
| 2007/0035660 A1 | 2/2007 | Gong |
| 2008/0165860 A1 | 7/2008 | Sahraoui et al. |

(Continued)

OTHER PUBLICATIONS

International Preliminary Report on Patentability from International Application No. PCT/US2013/049613, dated Jan. 22, 2015, 8 pp.

(Continued)

*Primary Examiner* — Frank Huang
(74) *Attorney, Agent, or Firm* — Shumaker & Sieffert, P.A.

(57) ABSTRACT

In one example, a device for decoding video data includes a processor configured to determine, for a supplemental enhancement information (SEI) network abstraction layer (NAL) unit of a bitstream, whether a NAL unit type value for the SEI NAL unit indicates that the NAL unit comprises a prefix SEI NAL unit including a prefix SEI message or a suffix SEI NAL unit including a suffix SEI message, and decode video data of the bitstream following the SEI NAL unit based on whether the SEI NAL unit is the prefix SEI NAL unit or the suffix SEI NAL unit and data of the SEI NAL unit.

12 Claims, 10 Drawing Sheets

(56) References Cited

U.S. PATENT DOCUMENTS

| | | | |
|---|---|---|---|
| 2009/0180761 | A1* | 7/2009 | Wand et al. .................. 386/109 |
| 2009/0185622 | A1 | 7/2009 | Itoh et al. |
| 2010/0008416 | A1* | 1/2010 | Ben-Zedeff et al. ..... 375/240.02 |
| 2010/0128779 | A1 | 5/2010 | Chatterjee et al. |
| 2010/0142613 | A1* | 6/2010 | Zhu .......................... 375/240.02 |
| 2010/0232521 | A1* | 9/2010 | Hagendorf et al. ...... 375/240.26 |
| 2011/0194604 | A1 | 8/2011 | Dei et al. |
| 2012/0044322 | A1* | 2/2012 | Tian et al. ....................... 348/43 |
| 2012/0207218 | A1 | 8/2012 | Asamura et al. |
| 2013/0322522 | A1 | 12/2013 | Nilsson et al. |
| 2014/0003537 | A1 | 1/2014 | Ramasubramonian et al. |
| 2014/0010281 | A1 | 1/2014 | Rodriguez et al. |
| 2014/0016697 | A1 | 1/2014 | Wang |
| 2014/0016708 | A1 | 1/2014 | Wang |

OTHER PUBLICATIONS

Recommendations ITU-T H.264, Advanced video coding for generic audiovisual services, Jan. 13, 2012, http://handle.itu.int/11.1002/1000/11466, 46 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Bross, B., et al., High Efficiency Video Coding (HEVC) text specification draft 10 (for FDIS & Last Call), Joint Collaborative Team on Video Coding (JCT-VC) of ITU-T SG16 WP3 and ISO/IEC JTC1/SC29/WG11, 12th Meeting: Geneva, CH, Jan. 14-23, 2013, Document JCTVC-L1003_v34, 310 pp.
Bross, B., et al., "High Efficiency Video Coding (HEVC) text specification draft 7," 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG,16); URL: http://wftp3.itu.int/av-arch/jctvc-site/, No. JCTVC-I1003, May 10, 2012, XP030112373, 269 pp.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d2, 290 pp.
Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, JCTVC-K1003_v7, pp. 290.
Bross, et al., "Suggested bug-fixes for HEVC text specification draft 6," Document JCTVC-I0030, Joint Collaborative Team on Video Coding (JCT-VC) of ITU-T SG16 WP3 and ISO/IEC JTC1/SC29/WG11, 9th Meeting: Geneva, CH, Apr. 27-May 7, 2012, 270 pages.
Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Haque et al., "Simplifications of HRD Parameters for Temporal Scalability", JCT-VC Meeting; MPEG Meeting; Jul. 11-20, 2012; Stockholm; (Joint Colloborative Team on Video Coding of ISO/IEC JTC1/SC29/WG11 and ITU-T SG.16); URL: http://eftp3.itu.int/av-arch/jtcvc-site/, No. JCTVC-J0272, XP030112634, 7 pp.
Hendry et al., "AHG 9: On NAL unit type", JCT-VC Meeting; MPEG Meeting; Jul. 11-20, 2012, Stockholm; (Joint Collaborative Team on Video Coding of ISO/IEC JTC1/SC29/WG11 and ITU-T SG.16); URL: http://wftp3.itu.int/av-arch/jctvc-site/, No. JCTVC-J0215, XP030112577, 2 pp.
International Search Report and Written Opinion—PCT/US2013/049613—ISA/EPO—Oct. 2, 2013, 11 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Kanumuri et al., "Refinement of random access point support", JCT-VC Meeting; MPEG Meeting; Jul. 11-20, 2012; Stockholm; (Joint Collaborative Team on Video Coding of ISO/IEC JTC1/SC29/WG11 and ITU-T SG.16); URL: http://wftp3.itu.int/av-arch/jctvc-site/, No. JCTVC-J0344, XP030112706, 3 pp.
Samuelsson et al., "Restrictions on leading pictures of CRA and BLA", JCT-VC Meeting; MPEG Meeting; Jul. 11-20, 2012; Stockholm; (Joint Collaborative Team on Video Coding of ISO/IEC JTC1/SC29/WG11 and ITU-T SG.16 ); URL: http://wftp3.itu.int/av-arch/jctvc-site/,, No. JCTVC-J0251, XP030112613, 4 pp.
Wang et al., "AHG9: On RAP pictures", JCT-VC Meeting; MPEG Meeting; Jul. 11-20, 2012; Stockholm; (Joint Collaborative Team on Video Coding of ISO/IEC JTC1/SC29/WG11 and ITU-T SG.16); URL: http://wftp3.itu.int/av-arch/jctvc-site/, No. JCTVC-J0107, XP030112469, 7 pp.
Wang "AHG9: High-level syntax clean-ups", JCT-VC Meeting; MPEG Meeting; Oct. 10-19, 2012; Shanghai; (Joint Colloborative Team on Video Coding of ISO/IEC JTC1/SC29/WG11 and ITU-T SG.16); URL: http://wftp3.itu.int/av-arch/jctvc-site/., No. JCTVC-K0120, XP030113002, 7 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand, T., et al., "WD3: Working Draft 3 of High-Efficiency Video Coding," Document JCTVC-E603, 5th Meeting: Geneva, CH, Mar. 16-23, 2011, pp. 193.
Wiegand et al., "WD1: Working Draft 1 of High-Efficiency Video Coding", JCTVC-C403, 3rd Meeting: Guangzhou, CN, Oct. 7-15, 2010, 137 pp.
Wang "AHG9: On fixed_pic_rate_flag", JCT-VC Meeting; MPEG Meeting; Jul. 11-20, 2012; Stockholm; (Joint Colloborative Team on Video Coding of ISO/IEC JTC1/SC29/WG11 and ITU-T SG.16); URL: http://eftp3.itu.int/av-arch/jctvc-site/,, No. JCTVC-J0570, XP030112932, 4 pp.
Wang "On allocation of NAL unit types", MPEG Meeting; Apr. 27-May 7, 2012; Geneva; (Motion Picture Expert Group or ISO/IEC JTC1/SC29/WG11), No. m25267, XP030053609, 4 pp.
Hendry et al: "Undiscardable Leading Pictures for CRA", JCT-VC Meeting; MPEG Meeting; Nov. 21-30, 2011 Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G158, Nov. 8, 2011, XP030110142, 7 pp.
Sullivan, "CRA pictures with broken links", MPEG Meeting; Apr. 27-May 7, 2012; Geneva; (Motion Picture Expert Group or ISO/IEC JTC1/SC29/WG11), No. m24653, No. JCTVC-I0404 rev.1; May 7, 2012, XP030052996, 3 pp.
ITU-T H.265, Series H: Audiovisual and Multimedia Systems, Infrastructure of audiovisual services—Coding of moving video, High efficiency video coding, The International Telecommunication Union, Apr. 2015, 634 pp.

* cited by examiner

CODING SEI NAL UNITS FOR VIDEO CODING

RELATED APPLICATIONS

This application claims the benefit of:
U.S. Provisional Application No. 61/670,066, filed Jul. 10, 2012, which is hereby incorporated by reference in its entirety.

TECHNICAL FIELD

This disclosure generally relates to processing video data and, more particularly, to random access pictures used in video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by ITU-T H.261, ISO/IEC MPEG-1 Visual, ITU-T H.262, ISO/IEC MPEG-2 Visual, ITU-T H.263, ITU-T H.264/MPEG-4, Part 10, Advanced Video Coding (AVC), and the High Efficiency Video Coding (HEVC) standard presently under development, and extensions of such standards. Video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based predictive video coding, a video slice (e.g., a video frame or a portion of a video frame) may be partitioned into video blocks, which may also be referred to as macroblocks, treeblocks, coding tree units (CTUs), coding tree blocks (CTBs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. Pixels may also be referred to as picture elements, pels, or samples. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for processing video data. In particular, this disclosure describes techniques that may be used to reduce delay in video applications, such as conversational applications, provide improvements in random access of a coded video sequence, and provide information for video content that is of fixed picture rate and supports temporal scalability.

In one example, a method of decoding video data includes decapsulating a slice of a random access point (RAP) picture of a bitstream from a network abstraction layer (NAL) unit, wherein the NAL unit includes a NAL unit type value that indicates whether the RAP picture is of a type that can have associated leading pictures and whether the RAP picture is an instantaneous decoder refresh (IDR) picture or a clean random access (CRA) picture, determining whether the RAP picture can have associated leading pictures based on the NAL unit type value; and decoding video data of the bitstream following the RAP picture based on the determination of whether the RAP picture can have associated leading pictures.

In another example, a device for decoding video data, the device comprising a processor configured to decapsulate a slice of a random access point (RAP) picture of a bitstream from a network abstraction layer (NAL) unit, wherein the NAL unit includes a NAL unit type value that indicates whether the RAP picture is of a type that can have associated leading pictures and whether the RAP picture is an instantaneous decoder refresh (IDR) picture or a clean random access (CRA) picture, determine whether the RAP picture can have associated leading pictures based on the NAL unit type value, and decode video data of the bitstream following the RAP picture based on the determination of whether the RAP picture can have associated leading pictures.

In another example, a device for decoding video data includes means for decapsulating a slice of a random access point (RAP) picture of a bitstream from a network abstraction layer (NAL) unit, wherein the NAL unit includes a NAL unit type value that indicates whether the RAP picture is of a type that can have associated leading pictures and whether the RAP picture is an instantaneous decoder refresh (IDR) picture or a clean random access (CRA) picture, means for determining whether the RAP picture can have associated leading pictures based on the NAL unit type value, and means for decoding video data of the bitstream following the RAP picture based on the determination of whether the RAP picture can have associated leading pictures.

In another example, a computer-readable storage medium has stored thereon instructions that, when executed, cause a processor to decapsulate a slice of a random access point (RAP) picture of a bitstream from a network abstraction layer (NAL) unit, wherein the NAL unit includes a NAL unit type value that indicates whether the RAP picture is of a type that can have associated leading pictures and whether the RAP picture is an instantaneous decoder refresh (IDR) picture or a clean random access (CRA) picture, determine whether the RAP picture can have associated leading pictures based on the NAL unit type value, and decode video data of the bitstream following the RAP picture based on the determination of whether the RAP picture can have associated leading pictures.

In another example, a method of generating a bitstream including video data, the method comprising determining whether a random access point (RAP) picture is of a type that can have associated leading pictures and whether the RAP picture comprises an instantaneous decoder refresh (IDR) picture or a clean random access (CRA) picture, encapsulating a slice of the RAP picture in a network abstraction layer (NAL) unit, wherein the NAL unit includes a NAL unit type value that indicates whether the RAP picture is of a type that can have associated leading pictures, and generating a bitstream including the NAL unit.

In another example, a device for generating a bitstream including video data includes a processor configured to determine whether a random access point (RAP) picture is of a type that can have associated leading pictures and whether the RAP picture comprises an instantaneous decoder refresh (IDR) picture or a clean random access (CRA) picture, encapsulate a slice of the RAP picture in a network abstraction layer (NAL) unit, wherein the NAL unit includes a NAL unit type value that indicates whether the RAP picture is of a type that can have associated leading pictures, and generate a bitstream including the NAL unit.

In another example, a device for generating a bitstream including video data includes means for determining whether a random access point (RAP) picture is of a type that can have associated leading pictures and whether the RAP picture comprises an instantaneous decoder refresh (IDR) picture or a clean random access (CRA) picture, means for encapsulating a slice of the RAP picture in a network abstraction layer (NAL) unit, wherein the NAL unit includes a NAL unit type value that indicates whether the RAP picture is of a type that can have associated leading pictures, and means for generating a bitstream including the NAL unit.

In another example, a computer-readable storage medium has stored thereon instructions that, when executed, cause a processor to determine whether a random access point (RAP) picture is of a type that can have associated leading pictures and whether the RAP picture comprises an instantaneous decoder refresh (IDR) picture or a clean random access (CRA) picture, encapsulate a slice of the RAP picture in a network abstraction layer (NAL) unit, wherein the NAL unit includes a NAL unit type value that indicates whether the RAP picture is of a type that can have associated leading pictures, and generate a bitstream including the NAL unit.

In another example, a method of decoding video data includes determining, for a supplemental enhancement information (SEI) network abstraction layer (NAL) unit of a bitstream, whether a NAL unit type value for the SEI NAL unit indicates that the NAL unit comprises a prefix SEI NAL unit including a prefix SEI message or a suffix SEI NAL unit including a suffix SEI message, and decoding video data of the bitstream following the SEI NAL unit based on whether the SEI NAL unit is the prefix SEI NAL unit or the suffix SEI NAL unit and data of the SEI NAL unit.

In another example, a device for decoding video data includes a processor configured to determine, for a supplemental enhancement information (SEI) network abstraction layer (NAL) unit of a bitstream, whether a NAL unit type value for the SEI NAL unit indicates that the NAL unit comprises a prefix SEI NAL unit including a prefix SEI message or a suffix SEI NAL unit including a suffix SEI message, and decode video data of the bitstream following the SEI NAL unit based on whether the SEI NAL unit is the prefix SEI NAL unit or the suffix SEI NAL unit and data of the SEI NAL unit.

In another example, a device for decoding video data includes means for determining, for a supplemental enhancement information (SEI) network abstraction layer (NAL) unit of a bitstream, whether a NAL unit type value for the SEI NAL unit indicates that the NAL unit comprises a prefix SEI NAL unit including a prefix SEI message or a suffix SEI NAL unit including a suffix SEI message, and means for decoding video data of the bitstream following the SEI NAL unit based on whether the SEI NAL unit is the prefix SEI NAL unit or the suffix SEI NAL unit and data of the SEI NAL unit.

In another example, a computer-readable storage medium has stored thereon instructions that, when executed, cause a processor to determine, for a supplemental enhancement information (SEI) network abstraction layer (NAL) unit of a bitstream, whether a NAL unit type value for the SEI NAL unit indicates that the NAL unit comprises a prefix SEI NAL unit including a prefix SEI message or a suffix SEI NAL unit including a suffix SEI message, and decode video data of the bitstream following the SEI NAL unit based on whether the SEI NAL unit is the prefix SEI NAL unit or the suffix SEI NAL unit and data of the SEI NAL unit.

In another example, a method of generating a bitstream including video data includes determining whether a supplemental enhancement information (SEI) message is a prefix SEI message or a suffix SEI message, wherein the SEI message includes data related to encoded video data, encapsulating the SEI message in an SEI NAL unit, wherein the SEI NAL unit includes a NAL unit type value that indicates whether the SEI NAL unit is a prefix SEI NAL unit or a suffix SEI NAL unit and whether the SEI message is a prefix SEI message or a suffix SEI message, and generating a bitstream including at least the SEI NAL unit.

In another example, a device for generating a bitstream including video includes a processor configured to determine whether a supplemental enhancement information (SEI) message is a prefix SEI message or a suffix SEI message, wherein the SEI message includes data related to encoded video data, encapsulate the SEI message in an SEI NAL unit, wherein the SEI NAL unit includes a NAL unit type value that indicates whether the SEI NAL unit is a prefix SEI NAL unit or a suffix SEI NAL unit and whether the SEI message is a prefix SEI message or a suffix SEI message, and generate a bitstream including at least the SEI NAL unit.

In another example, a device for generating a bitstream including video data includes means for determining whether a supplemental enhancement information (SEI) message is a prefix SEI message or a suffix SEI message, wherein the SEI message includes data related to encoded video data, means for encapsulating the SEI message in an SEI NAL unit, wherein the SEI NAL unit includes a NAL unit type value that indicates whether the SEI NAL unit is a prefix SEI NAL unit or a suffix SEI NAL unit and whether the SEI message is a prefix SEI message or a suffix SEI message, and means for generating a bitstream including at least the SEI NAL unit.

In another example, a computer-readable storage medium having stored thereon instructions that, when executed, cause a processor to determine whether a supplemental enhancement information (SEI) message is a prefix SEI message or a suffix SEI message, wherein the SEI message includes data related to encoded video data, encapsulate the SEI message in an SEI NAL unit, wherein the SEI NAL unit includes a NAL unit type value that indicates whether the SEI NAL unit is a prefix SEI NAL unit or a suffix SEI NAL unit and whether the SEI message is a prefix SEI message or a suffix SEI message, and generate a bitstream including at least the SEI NAL unit.

In another example, a method of presenting video data includes determining an integer value for the video data, determining a difference value between a presentation time of a first picture and a presentation time of a second picture, wherein the difference value is equal to the integer value multiplied by a clock tick value, and presenting the first picture and the second picture according to the determined difference value.

In another example, a device for presenting video data includes a processor configured to determine an integer value for the video data, determine a difference value between a presentation time of a first picture and a presentation time of a second picture, wherein the difference value is equal to the integer value multiplied by a clock tick value, and present the first picture and the second picture according to the determined difference value.

In another example, a device for presenting video data includes means for determining an integer value for the video data, means for determining a difference value between a presentation time of a first picture and a presentation time of a second picture, wherein the difference value is equal to the integer value multiplied by a clock tick value, and means for presenting the first picture and the second picture according to the determined difference value.

In another example, a computer-readable storage medium has stored thereon instructions that, when executed, cause a processor to determine an integer value for the video data, determine a difference value between a presentation time of a first picture and a presentation time of a second picture, wherein the difference value is equal to the integer value multiplied by a clock tick value, and present the first picture and the second picture according to the determined difference value.

In another example, a method of generating a bitstream including video data includes generating data indicating whether a difference between a presentation time of a first picture and a presentation time of a second picture is an integer multiple of a clock tick value, and, when the data indicates that the difference is the integer multiple of the clock tick value, generating data representative of the integer multiple.

In another example, a device for generating a bitstream including video data includes a processor configured to generate data indicating whether a difference between a presentation time of a first picture and a presentation time of a second picture is an integer multiple of a clock tick value, and, when the data indicates that the difference is the integer multiple of the clock tick value, generate data representative of the integer multiple.

In another example, a device for generating a bitstream including video data includes means for generating data indicating whether a difference between a presentation time of a first picture and a presentation time of a second picture is an integer multiple of a clock tick value, and means for generating, when the data indicates that the difference is the integer multiple of the clock tick value, data representative of the integer multiple.

In another example, a computer-readable storage medium has stored thereon instructions that, when executed, cause a processor to generate data indicating whether a difference between a presentation time of a first picture and a presentation time of a second picture is an integer multiple of a clock tick value; and, when the data indicates that the difference is the integer multiple of the clock tick value, generate data representative of the integer multiple.

The details of one or more examples are set forth in the accompanying drawings and the description below. Other features, objects, and advantages will be apparent from the description and drawings, and from the claims.

DETAILED DESCRIPTION

Figure 1:
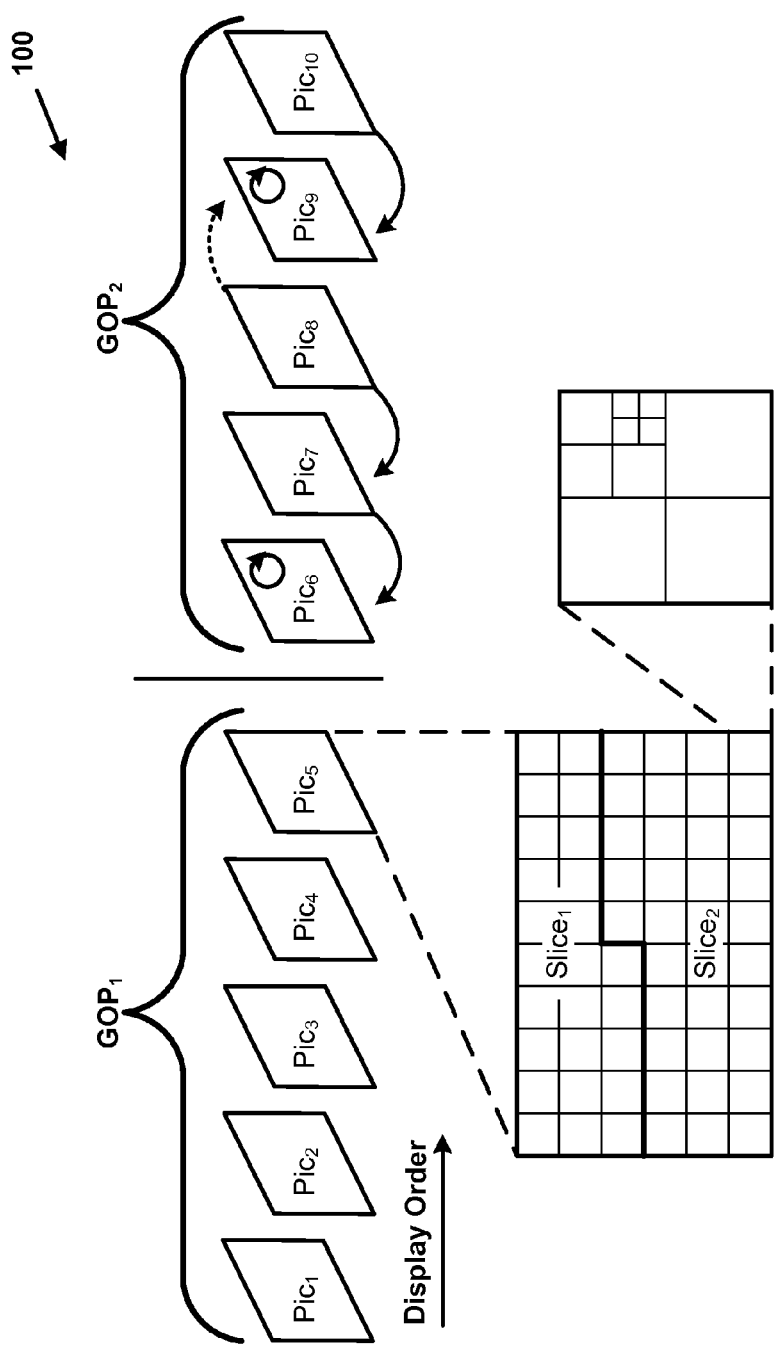
FIG. 1 is a conceptual diagram illustrating a video sequence coded according to predictive video coding techniques.

This disclosure describes various improved video coding designs. In particular, this disclosure describes techniques that may be used to reduce delay in video applications, such as conversational applications, and provide improvements in random access of a coded video sequence.

Digital video devices implement video compression techniques to encode and decode digital video information more efficiently. Video compression techniques may be defined according to a video coding standard, such as AVC or HEVC. The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

A recent working Draft (WD) of HEVC, referred to as "HEVC Working Draft 7" or "WD7," is described in document JCTVC-I1003_d5, Bross et al., "WD7: Working Draft 7 of High-Efficiency Video Coding (HEVC)," Joint Collaborative Team on Video Coding (JCT-VC) of ITU-T SG16 WP3 and ISO/IEC JTC1/SC29/WG11, $9^{th}$ Meeting: Geneva, Switzerland, Apr. 27, 2012 to May 7, 2012. Further, another recent working draft of HEVC, Working Draft 9, is described in document HCTVC-K1003 d7, Bross et al., "High Efficiency Video Coding (HEVC) Text Specification Draft 9," Joint Collaborative Team on Video Coding (JCT-VC) of ITU-T SG16 WP3 and ISO/IEC JTC1/SC29/WG11, 11th Meeting: Shanghai, CN, October, 2012. The upcoming HEVC standard may also be referred to as ISO/IEC 23008-HEVC, which is intended to be the standard number for the delivered version of HEVC. In some aspects, the techniques described in this disclosure may be applied to devices that generally conform to the H.264 and/or upcoming HEVC standard. Although techniques of this disclosure are described with respect to the H.264 standard and the upcoming HEVC standard, the techniques of this disclosure are generally applicable to any video coding standard.

A video sequence typically includes a series of video frames, also referred to as pictures. Examples of video applications where a video sequence is encoded and/or decoded include local playback, streaming, broadcast, multicast and conversational applications. Conversational applications include video telephony and video conferencing and are also referred to as low-delay applications. Conversational applications require a relatively low end-to-end delay of the entire systems, i.e., the delay between the time when a video frame is captured at a first digital video device and the time when the video frame is displayed at a second digital video device. Typically acceptable end-to-end delay for conversational applications should be less than 400 ms, and an end-to-end delay of around 150 ms is considered very good.

Each step associated with processing a video sequence may contribute to the overall end-to-end delay. Examples of delays associated with processing a video sequence include capturing delay, pre-processing delay, encoding delay, transmission delay, reception buffering delay (for de-jittering), decoding delay, decoded picture output delay, post-processing delay, and display delay. The delay associated with coding a video sequence according to a particular video coding standard may be referred to as the codec delay and may include an encoding delay, a decoding delay and a decoded picture output delay. The codec delay should be minimized in conversational applications. In particular, the coding structure of a video sequence should ensure that the output order of pictures in the video sequence is identical to the decoding order of pictures in the video sequence, such that the decoded picture output delay is equal to zero. The coding structure of a video sequence refers in part to the allocation of picture types used to encode a video sequence.

A group of pictures (GOP) generally comprises a sequence of one or more pictures arranged according to display order. According to HEVC, a video encoder may divide a video frame or picture may into a series of equally-sized video blocks. A video block may have a luminance component (denoted as Y) and two chroma components (denoted as U and V or Cb and Cr). These video blocks may also to referred to as largest coding units (LCUs), treeblocks, or coding treeblock units (CTUs). The LCUs of HEVC may be broadly analogous to the macroblocks of previous standards, such as H.264/AVC. However, an LCU is not necessarily limited to a particular size. According to HEVC, syntax data within a bitstream may define an LCU according to the number of horizontal and/or vertical luma samples. For example, an LCU may be defined as including 64×64 or 32×32 luma samples. Further, an LCU may be partitioned into multiple coding units (CUs) according to a quadtree partitioning scheme. In general, quadtree partitioning refers to recursively splitting CUs into four sub-CUs. Syntax data associated with a coded bitstream may define a maximum number of times an LCU may be split, referred to as a maximum CU depth, and may also define a minimum size of a CU. Accordingly, a bitstream may also define a smallest coding unit (SCU). For example, an SCU may be defined as including 8×8 luma samples.

Furthermore, according to HEVC, a video encoder may partition a picture into a plurality of slices, wherein each of the slices includes an integer number of LCUs. Slices may be I slices, P slices, or B slices, where I, P, and B define how other video blocks are used to predict the CUs. An I slice is predicted using an intra-prediction mode (e.g., from video blocks within the same frame). Intra coding relies on spatial prediction to reduce or remove spatial redundancy in video within a given video frame or picture. A P slice is predicted using a unidirectional inter-prediction mode (e.g., from video block in a previous frame). A B slice is predicted using a bi-directional inter-prediction mode (e.g., from video blocks within a previous frame and a subsequent frame). Inter-coding relies on temporal prediction to reduce or remove temporal redundancy in video within adjacent frames or pictures of a video sequence.

FIG. 1 is a conceptual diagram illustrating video sequence coded according to predictive video coding techniques. As illustrated in FIG. 1, video sequence 100 includes pictures $Pic_1$-$Pic_{10}$. In the conceptual diagram of FIG. 1 pictures $Pic_1$-$Pic_{10}$ are arranged and sequentially numbered according to the order in which they are to be displayed. As described in more detail below, the display order does not necessarily correspond to a decoding order. As illustrated in FIG. 1, video sequence 100 includes $GOP_1$ and $GOP_2$, where pictures $Pic_1$-$Pic_5$ are included in $GOP_1$ and pictures $Pic_6$-$Pic_{10}$ are included in $GOP_2$. FIG. 1 illustrates where $Pic_5$ is partitioned into $slice_1$ and $slice_2$, where each of $slice_1$ and $slice_2$ includes consecutive LCUs according to a left-to-right top-to-bottom raster scan. Although not shown, the other pictures illustrated in FIG. 1 may be partitioned into one or more slices in a similar manner. FIG. 1 also illustrates the concept of I slices, P slices, or B slices with respect to $GOP_2$. The arrows associated with each of $Pic_6$-$Pic_{10}$ in $GOP_2$ indicate whether a picture includes I slices, P slices, or B slices based on a referenced picture indicated by the arrows. In FIG. 1, pictures $Pic_6$ and $Pic_9$ represent a pictures including I slices (i.e., references are with the picture itself), pictures $Pic_7$ and $Pic_{10}$ represent pictures including P slices (i.e., each reference a previous picture) and $Pic_8$ represents a picture including B slices (i.e., references a previous and a subsequent picture).

In HEVC, each of a video sequence, a GOP, a picture, a slice, and CU may be associated with a syntax data that describes video coding properties. For example, a slice includes a header that includes a syntax element that indicates whether the slice is an I slice, a P slice, or a B slice. Further, HEVC includes the concept of parameter sets. A parameter set is a syntax structure that includes syntax elements that allow a video decoder to reconstruct a video sequence. HEVC employs a hierarchical parameter set mechanism where syntax elements are included in a type of parameter set based on the frequency in which the syntax elements are expected to change. The parameter set mechanism in HEVC decouples the transmission of infrequently changing information from the transmission of coded block data. Further, in some applications the parameter sets may be conveyed "out-of-band," i.e., not transported together with the units containing coded video data. Out-of-band transmission is typically reliable.

In HEVC WD7, a particular parameter set is identified using a parameter set ID. In HEVC WD7, a parameter set ID is an unsigned integer Exp-Golomb-coded syntax element with the left bit first. HEVC WD7 defines the following parameter sets:

Video Parameter Set (VPS): A VPS is a syntax structure that contains syntax elements that apply to zero or more entire coded video sequences. That is, a VPS includes syntax elements that are expected to remain unchanged for a sequence of frames (e.g., picture order, number of reference frames, and picture size). A VPS is identified using a VPS ID. A Sequence Parameter Set includes a VPS ID.

Sequence Parameter Set (SPS)—A SPS is a syntax structure that includes syntax elements that apply to zero or more entire coded video sequences. That is, a SPS includes syntax elements that are expected to remain unchanged for a sequence of frames (e.g., picture order, number of reference frames, and picture size). An SPS is identified using an SPS ID. A Picture Parameter Set includes a SPS ID.

Picture Parameter Set (PPS)—A PPS is a syntax structure that includes syntax elements that apply to one or more pictures. That is, a PPS includes syntax elements that may change from picture-to-picture within a sequence (e.g., entropy coding mode, quantization parameters, and bit depth). A PPS Parameter Set is identified using a PPS ID. A slice header includes a PPS ID.

Adaptive Parameter Set (APS)—An APS is a syntax structure that includes syntax elements that apply to one or more pictures. An APS includes syntax elements that are expected to change within pictures of a sequence (e.g., block size, and deblock filtering). An APS set is identified using an APS ID. A slice header may include an APS ID.

According to the defined parameter set types in HEVC WD7, each SPS refers to a VPS ID, each PPS refers to an SPS ID, and each slice header refers to a PPS ID and possibly an APS ID. It should be noted that in some cases, the linear referencing relationship of including a VPS ID in an SPS and a SPS ID in a PPS may be inefficient. For example, although VPS is supported in HEVC WD7, most of the sequence level information parameters are still only present in the SPS. In addition to the concept of parameter sets, HEVC includes the concept of coded video sequences and access units. According to HEVC WD7, a coded video sequence and an access unit are defined as follows:

Coded video sequence: A sequence of access units that consists, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit [CRA, IDR, and BLA access units are described in detail below].

Access unit: A set of NAL units that are consecutive in decoding order and contain one coded picture. In addition to the coded slice NAL units of the coded picture, the access unit may also contain other NAL units not containing slices of the coded picture. The decoding of an access unit always results in a decoded picture.

Figure 2:
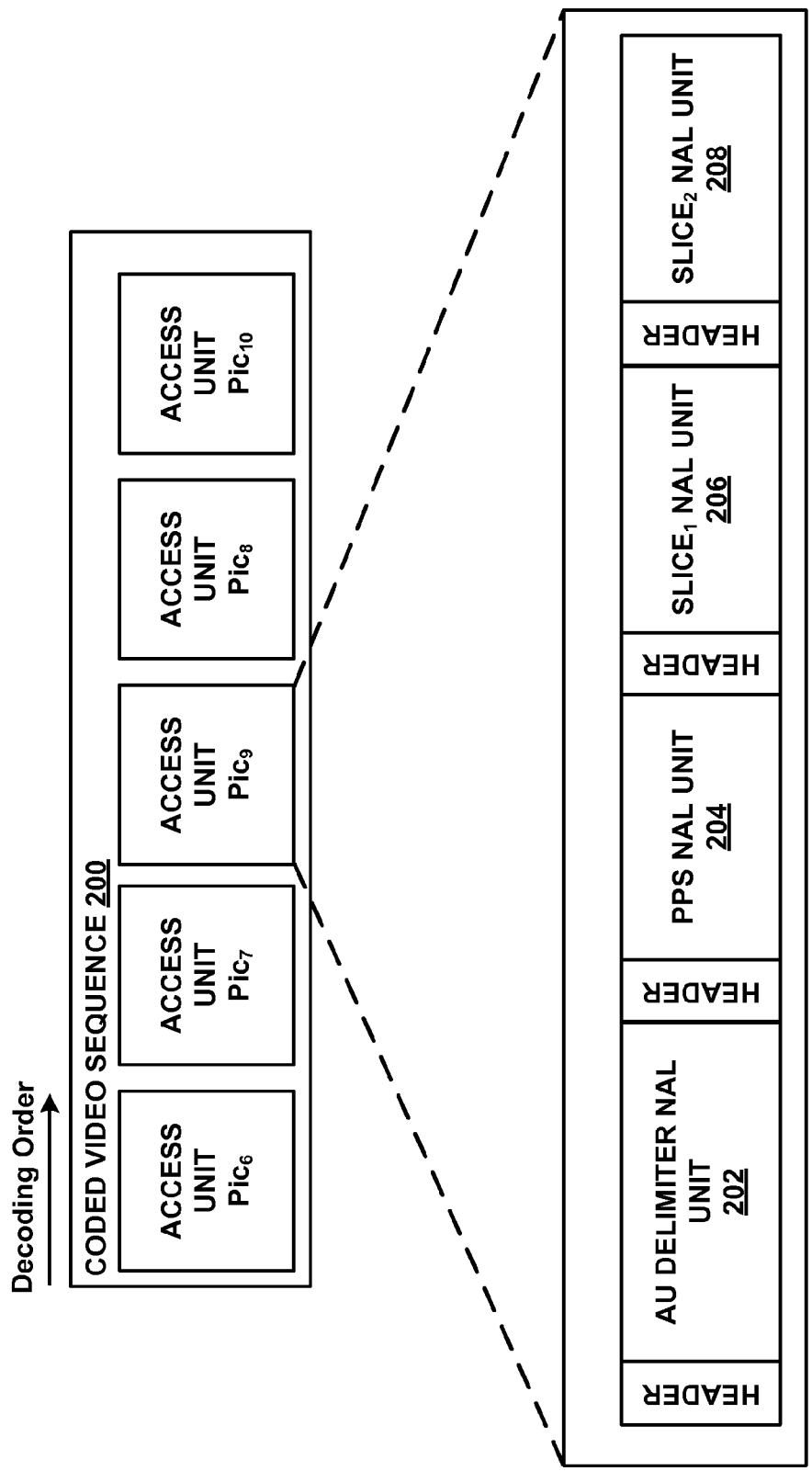
FIG. 2 is a conceptual diagram illustrating an example of a coded video sequence.

A NAL unit refers to a Network Abstraction Layer unit. Thus, according to HEVC, a bitstream of coded video data includes a sequence of NAL units. An access unit is a set of NAL units that are arranged consecutively in decoding order and contain exactly one coded picture and a coded video sequence includes a sequence of access units arranged in decoding order. FIG. 2 is a conceptual diagram illustrating an example of a coded video sequence. FIG. 2 represents an example of a coded video sequence 200 which may correspond to $GOP_2$ illustrated in FIG. 1. As illustrated in FIG. 2, coded video sequence 200 includes an access unit corresponding to each of $Pic_6$-$Pic_{10}$. The access units of coded video sequence 200 are arranged sequentially according to decoding order. It should be noted that the access unit corresponding to $Pic_9$ is located before the access unit corresponding to $Pic_8$. Thus, the decoding order does not correspond to the display order illustrated in FIG. 1. In this example, this is due to the fact that $Pic_8$ references $Pic_9$. Thus, $Pic_9$ must be decoded before $Pic_8$ can be decoded. FIG. 2 illustrates where the access unit corresponding to $Pic_9$ includes NAL units: AU delimiter NAL unit 202, PPS NAL unit 204, $slice_1$ NAL unit 206, and $slice_2$ NAL unit 208. Each NAL Unit may include a header which identifies the NAL unit type.

HEVC defines two NAL unit type classes: coded slice NAL units (VCL) and non-VCL NAL units. A coded slice NAL unit contains a slice of video data. In the example illustrated in FIG. 2, $slice_1$ NAL unit 206, and $slice_2$ NAL unit 208 each contain a slice of video data and are examples of VCL NAL units. In the example of FIG. 2, each of $slice_1$ NAL unit 206, and $slice_2$ NAL unit 208 may be I-slices. A non-VCL NAL includes that contains information other than a slice of video data. For example, a non-VCL may contain delimiter data or a parameter set. In the example, illustrated in FIG. 2 AU delimiter NAL unit 202 includes information to delimit the access unit corresponding to $Pic_9$ from the access unit corresponding to $Pic_7$. Further, PPS NAL unit 204 includes a picture parameter set. Thus, AU delimiter NAL unit 202, and PPS NAL unit 204 are examples of non-VCL NAL units.

Another example of a non-VCL NAL unit in HEVC is the supplemental enhancement information (SEI) NAL unit. The SEI mechanism supported in both AVC and HEVC enables encoders to include metadata in the bitstream that is not required for correct decoding of the sample values of the output pictures, but can be used for various other purposes, such as picture output timing, displaying, as well as loss detection and concealment. For example, SEI NAL units may include picture timing messages that are used by a video decoder when decoding a bitstream. Picture timing messages may include information that indicates when a video decoder should begin to decode a VCL NAL unit. Encoders can include any number of SEI NAL units in an access unit, and each SEI NAL unit may contain one or more SEI messages. The draft HEVC standard includes the syntax and semantics for several SEI messages, but the handling of the SEI messages is not specified, because they do not affect the normative decoding process. One reason to have SEI messages in the draft HEVC standard is to enable supplemental data to be interpreted identically in different systems using HEVC. Specifications and systems using HEVC may require encoders to generate certain SEI messages or may define specific handling of particular types of received SEI messages. The Table 1 lists the SEI messages specified in HEVC and briefly describes their purposes.

TABLE 1

Overview of SEI Messages

| SEI message | Purpose |
| --- | --- |
| Buffering period | Initial delays for hypothetical reference decoder (HRD) operation |

TABLE 1-continued

Overview of SEI Messages

| SEI message | Purpose |
| --- | --- |
| Picture timing | Picture output time and picture/sub-picture removal time for HRD operation, as well as picture structure related information |
| Pan-scan rectangle | Displaying at a different picture aspect ratio (PAR) than the PAR of the output pictures |
| Filler payload | Adjusting the bitrate to meet specific constraints |
| User data registered User data unregistered | SEI messages to be specified by external entities |
| Recovery point | Additional information for clean random access. Gradual decoding refresh. |
| Scene information | Information about scene changes and transitions |
| Full-frame snapshot | Indication to label the associated decoded picture as a still-image snapshot of the video content |
| Progressive refinement segment | Indicates that certain consecutive pictures represent a progressive refinement of the quality of a picture rather than a moving scene |
| Film grain characteristics | Enables decoders to synthesize film grain |
| Deblocking filter display preference | Recommends whether or not displayed pictures should undergo the in-loop deblocking filter process |
| Post-filter hint | Provides suggested post-filter coefficients or correlation information for post-filter design |
| Tone mapping information | Remapping to another color space than that used or assumed in encoding |
| Frame packing arrangement | Packing of stereoscopic video into an HEVC bitstream |
| Display orientation | Specifies flipping and/or rotation that should be applied to the output pictures when they are displayed |
| Structure of pictures description | Describes the temporal and inter prediction structure of the bitstream |
| Decoded picture hash | Checksum of the decoded picture, which may be used for error detection |
| Active parameter sets | Provides information on of active VPS, SPS, etc. |
| Decoding unit information | Sub-picture removal time for HRD operation, as well as decoding unit index |
| Temporal level zero index | Provides temporal level zero index values |
| Scalable nesting | Provides a mechanism to nest SEI messages for association to different operation points and layers |
| Region refresh information | Provides information on refreshed and non-refreshed region for gradual decoding refresh |

Random access refers to the decoding of a video bitstream starting from a coded picture that is not the first coded picture in the bitstream. Random access to a bitstream is needed in many video applications, such as broadcasting and streaming, e.g., for users to switch between different channels, to jump to specific parts of the video, or to switching to a different bitstream for stream adaptation (e.g., for bit rate, frame rate, or spatial resolution scalability). Random access is enabled by having a coding structure that includes Random Access Point (RAP) pictures or access units, many times in regular intervals, for a video sequence. Instantaneous Decoder Refresh (IDR) pictures, Clean Random Access (CRA) pictures and broken link access (BLA) pictures are types of RAP pictures defined in HEVC WD7. Each of IDR pictures, CRA pictures and BLA pictures include only I slices. However, each of IDR pictures, CRA pictures and BLA pictures differ based on defined referencing constraints.

IDR pictures are specified in AVC and defined according to HEVC WD7. While IDR pictures can be used for random access, IDR pictures are constrained in that pictures following an IDR picture in decoding order cannot use pictures decoded prior to the IDR picture as reference. In the example illustrated in FIGS. 1 and 2, as described above, $pic_6$ in video sequence 100 may be an IDR picture. Due to the constraints associated with IDR pictures, bitstreams relying on IDR pictures for random access may have significantly lower coding efficiency.

To improve coding efficiency, the concept of CRA pictures was introduced in HEVC. According to HEVC WD7, a CRA picture, like an IDR picture, includes only I slices. However, pictures that follow a CRA picture in decoding order, but precede the CRA pictures in output order are allowed to use pictures decoded before the CRA picture as reference. Pictures that follow a CRA picture in decoding order but precede the CRA picture in output order are referred to as leading pictures associated with the CRA picture (or leading pictures of the CRA picture). The leading pictures of a CRA picture are correctly decodable if the decoding starts from an IDR or CRA picture before the current CRA picture. However, the leading pictures of a CRA picture may be not be correctly decodable when random access from the CRA picture occurs. Referring to the example illustrated in FIGS. 1 and 2, $Pic_9$ may be a CRA picture and $Pic_8$ may be a leading picture of $Pic_9$. $Pic_8$ is correctly decodable is $GOP_2$ is accessed at $Pic_6$, but may not be correctly decodable if $GOP_2$ is accessed as $Pic_9$. This is due to the fact that $Pic_7$ may not be available if $GOP_2$ is accessed as $Pic_9$. To prevent error propagation from reference pictures that may not be available depending on where the decoding starts, according to HEVC WD7 all pictures that follow a CRA picture both in decoding order and output order are constrained not to use any picture that precedes the CRA picture either in decoding order or output order (which includes the leading pictures) as reference. Further, leading pictures are typically discarded during random access decoding.

Bitstream splicing refers to the concatenation of two or more bitstreams or parts thereof. For example, a first bitstream may be appended by a second bitstream, possibly with some modifications to either one or both of the bitstreams to generate a spliced bitstream. The first coded picture in the second bitstream is also referred to as the splicing point. Therefore, pictures after the splicing point in the spliced bitstream were originated from the second bitstream while pictures preceding the splicing point in the spliced bitstream were originated from the first bitstream. Splicing of bitstreams is typically performed by bitstream splicers. Bitstream splicers are often lightweight and much less intelligent than video encoders. For example, a bitstream splicer may not be equipped with entropy decoding and encoding capabilities. Temporal scalability is an application that may use bitstream splicing. Temporal scalability may refer to decoding a video sequence at one or more frame rates. For example, a video sequence may be capable of being decoded at 30 frames-per-second (fps) or 60 fps based on system capabilities. To achieve temporal scalability a video sequence may include a plurality of temporal layers. Where each temporal layer is a coded video sequence associated with a frame rate. The temporal layer with the highest frame rate may referred to as the highest temporal layer. A plurality of temporal layers may be spliced together to generate the video sequence at the highest frame rate, e.g., coded video sequence with 30 fps is spliced with coded video sequence that enables 60 fps.

Bitstream switching may be used in adaptive streaming environments. A bitstream switching operation at certain picture in the switch-to bitstream is effectively a bitstream splicing operation wherein the splicing point is the bitstream switching point, i.e., the first picture from the switch-to bitstream. It should be noted that bitstream switching is usually performed on two streams with the same coding structure. That is, the two streams have the same prediction structure and the same allocation of IDR pictures, CRA pictures, P pictures and B pictures, etc.

The concept of a broken link access (BLA) picture was further introduced in HEVC WD7 after the introduction of CRA pictures and is based on the concept of CRA pictures. A BLA picture typically originates from bitstream splicing at the position of a CRA picture, and in the spliced bitstream the splicing point CRA picture is changed to a BLA picture. The most essential difference between BLA pictures and CRA pictures is as follows: for a CRA picture, the associated leading pictures are correctly decodable if the decoding starts from a RAP picture before the CRA picture in decoding order, and may not be correctly decodable when random access starts from the CRA picture; for a BLA picture, the associated leading pictures may be not be correctly decodable in all cases, even when the decoding starts from a RAP picture before the BLA picture in decoding order. It should be noted that for a particular CRA or BLA picture, some of the associated leading pictures are correctly decodable even when the CRA or BLA picture is the first picture in the bitstream. These leading pictures are referred to as decodable leading pictures (DLPs), and other leading pictures are referred to as non-decodable leading pictures (NLPs). NLPs are also referred to as tagged for discard (TFD) pictures in the HEVC WD9. It should be noted that all leading pictures associated with an IDR picture are DLP pictures. Table 2 is a table included in HEVC WD7 that specifies the NAL units defined according to HEVC WD7. As illustrated in Table 2, NAL unit types in HEVC WD7 include CRA picture, BLA picture, IDR picture, VPS, SPS, PPS, and APS NAL units types, which correspond to the pictures and parameter sets described above.

TABLE 2

HEVC WD7 NAL unit type codes and NAL unit type classes

| nal_unit_type | Content of NAL unit and RBSP syntax structure | NAL unit type class |
|---|---|---|
| 0 | Unspecified | non-VCL |
| 1 | Coded slice of a non-RAP, non-TFD and non-TLA picture slice_layer_rbsp( ) | VCL |
| 2 | Coded slice of a TFD picture slice_layer_rbsp( ) | VCL |
| 3 | Coded slice of a non-TFD TLA picture slice_layer_rbsp( ) | VCL |
| 4, 5 | Coded slice of a CRA picture slice_layer_rbsp( ) | VCL |
| 6, 7 | Coded slice of a BLA picture slice_layer_rbsp( ) | VCL |
| 8 | Coded slice of an IDR picture slice_layer_rbsp( ) | VCL |
| 9 ... 24 | Reserved | n/a |
| 25 | Video parameter set video_parameter_set_rbsp( ) | non-VCL |
| 26 | Sequence parameter set seq_parameter_set_rbsp( ) | non-VCL |
| 27 | Picture parameter set pic_parameter_set_rbsp( ) | non-VCL |
| 28 | Adaptation parameter set aps_rbsp( ) | non-VCL |
| 29 | Access unit delimiter access_unit_delimiter_rbsp( ) | non-VCL |
| 30 | Filler data filler_data_rbsp( ) | non-VCL |
| 31 | Supplemental enhancement information (SEI) sei_rbsp( ) | non-VCL |
| 32 ... 47 | Reserved | n/a |
| 48 ... 63 | Unspecified | non-VCL |

In order to simplify NAL unit allocations, S. Kanumuri, G. Sullivan, "Refinement of Random Access Point Support," 10th Meeting, Stockholm, SE, July 2012, Doc. JCTVC-J0344 (hereinafter "Kanumuri"), which is incorporated by reference in its entirety proposes (1) a constraint on IDR pictures such that there are no leading pictures associated with any IDR picture (i.e., no picture may follow a IDR picture in decoding order and precede an IDR picture in output order), and (2) modified allocation NAL Unit types 4 to 7 defined according to Table 2 above for RAP pictures as follows:

TABLE 3

Proposed NAL Unit types according to Kanumuri

| NAL unit type | Description | SAP types possible |
|---|---|---|
| 4 | CRA picture | 1, 2, 3 |
| 5 | BLA picture | 1, 2, 3 |
| 6 | BLA picture with no associated TFD pictures | 1, 2 |
| 7 | BLA picture with no leading pictures | 1 |

In Table 3 SAP types refer to Stream Access Point types defined in ISO/IEC 14496-12 4th Edition, "Information technology—Coding of audio-visual objects—Part 12: ISO base media file format," w12640, 100th MPEG meeting, Geneva, April 2012, which is incorporated by reference in its entirety. As described above, IDR pictures and BLA/CRA pictures are functionally different for bitsteam switching, though they are functionally the same for random access (e.g., seeking applications). For bitstream switching at IDR pictures, a video coding system may know or assume that the presentation can be continuous with no glitch (e.g., missing of pictures not presented). This is because pictures following an IDR picture in decoding order cannot use pictures decoded prior to the IDR picture as reference (i.e., leading pictures associated with an IDR picture are DLP). However, for bitstream switching at BLA pictures, some overlap-decoding of one or more pictures from both streams may be needed to ensure presentation is continuous. This overlap decoding may not currently be possible for HEVC WD7 compliant decoders without additional capability. Without additional capability there may not be any pictures at the associated TFD picture positions to be presented as they may have been discarded. This can result in presentation is not necessarily continuous. Further, even if the BLA picture is a BLA picture with no associated TFD pictures, the problem is the same because TFD pictures which were present in the original bitstream, may be discarded. Further, if there were no TFD pictures in the original bitstream, then the CRA picture (later changed to be a BLA picture due to bitstream splicing/switching, etc.) could have been encoded as an IDR picture. Therefore, not marking IDR pictures with leading pictures as IDR pictures (i.e., not allowing IDR pictures to have leading pictures), as proposed by Kanumuri, makes IDR pictures less friendly to systems for bitstream switching.

From streaming systems point of view, e.g., dynamic streaming over HTTP (DASH), it is beneficial to be able to easily identify which picture is a RAP picture and if decoding starts from a RAP picture what is the earliest presentation time (e.g., an earliest picture order count (POC) value). Therefore, existing designs of allocation of NAL unit types to different RAP pictures as well as DLP pictures and TFD pictures can be further improved to be friendlier to streaming systems. According to existing designs, for each RAP picture systems have to check whether there are associated DLP pictures to know whether the presentation time of the RAP picture itself is the earliest presentation time when the decoding starts from the RAP picture. Further, the system has to check and compare the presentation times of all the DLP pictures to figure out the value of the earliest presentation time.

Video coding standards include a specification of video buffering model. In AVC and HEVC, the buffering model is referred to as hypothetical reference decoder (HRD), which includes a buffering model of both a coded picture buffer (CPB) and a decoded picture buffer (DPB). According to HEVC WD7, the HRD is defined as a hypothetical decoder model that specifies constraints on the variability of conforming NAL unit streams or conforming bitstreams that an encoding process may produce. Thus, in AVC and HEVC, bitstream conformance and decoder conformance are specified as parts of the HRD specification. According to HEVC WD7, a CPB is a first-in first-out buffer containing access units in decoding order and a DPB is a buffer holding decoded pictures for reference. The CPB and DPB behaviors are mathematically specified according to the HRD. The HRD directly imposes constraints on timing, buffer sizes, and bit rate, and indirectly imposes constraints on bitstream characteristics and statistics. A complete set of HRD parameters include five basic parameters: initial CPB removal delay, CPB size, bit rate, initial DPB output delay, and DPB size. According to HEVC WD7, HRD parameters may be included in video usability information (VUI) parameters and VUI parameters may be included in a SPS. It should be noted that although the HRD is referred to as a decoder, the HRD is typically needed at the encoder side to guarantee bitstream conformance, and typically not needed at the decoder side. HEVC WD7 specifies two types of bitstreams for HRD conformance, namely Type I and Type II. HEVC WD7 also specifies two types of decoder conformance, namely output timing decoder conformance and output order decoder conformance.

In the AVC and HEVC HRD models, decoding or CPB removal is access unit based, and it is assumed that picture decoding is instantaneous. The time needed for decoding a picture in the real-world applications cannot be equal to zero. Thus, in practical applications, if a conforming decoder strictly follows the decoding times signaled, e.g., in the picture timing SEI messages, to start decoding of access units, then the earliest possible time a particular decoded picture can be output is equal to the decoding time of that particular picture plus the time needed for decoding that particular picture.

A sub-picture based CPB behavior similar to the CPB behavior described in Ye-Kui Wang, et al., "Sub-picture based CPB operation," 9th Meeting: Geneva, CH, May 2012, JCTVC-10588 (hereinafter "Wang") has been included in HEVC WD7. The Wang sub-picture based CPB allows for CPB removal to be carried out either at the access unit (AU) level or sub-picture level. Allowing either AU-level or sub-picture level CPB removal helps to achieve reduced codec delay in an interoperable manner. When CPB removal occurs at the access unit level, an access unit is removed from the CPB each time a removal operation occurs. When CPB removal occurs at the sub-picture level, a decoding unit (DU) containing one or more slices is removed from the CPB each time a removal operation occurs.

Sub-picture level CPB removal timing information may be signaled in addition to AU-level CPB removal timing information. When CPB removal timing information is present for both AU-level and sub-picture level removal, a decoder may choose to operate the CPB at either the AU level or sub-picture level. It should be noted that the in order for the current picture timing SEI message and the mechanism to enable both AU-level and DU-level HRD CPB removal at the same time to achieve sub-picture delay, DUs must be sent out before the entire AU is encoded, and the AU-level SEI messages cannot yet be sent out before the entire AU is encoded.

According to HEVC WD7 timing information may include information that defines the temporal distance between the HRD output times of two consecutive pictures. HEVC WD7 defines the following timing information syntax elements:

time_scale is the number of time units that pass in one second. For example, a time coordinate system that measures time using a 27 MHz clock has a time_scale of 27,000,000. time_scale shall be greater than 0.

num_units_in_tick is the number of time units of a clock operating at the frequency time_scale Hz that corresponds to one increment (called a clock tick) of a clock tick counter. num_units_in_tick shall be greater than 0.

Thus based on the values of time_scale and num_units_in_tick, the so-called clock tick variable, $t_c$, can be derived as follows:

$$t_c = \text{num\_units\_in\_tick} \div \text{time\_scale} \qquad (1)$$

According to HEVC WD7, the clock tick variable may be used to constrain HRD output times. That is, in some cases it may be required that the difference between the presentation times of two pictures continuous in output order (i.e., first and second picture) is equal to the clock tick. HEVC WD7 includes the fixed_pic_rate_flag syntax element which indicates whether the difference between the presentation times of two pictures continuous in output order is equal to the clock tick. The fixed_pic_rate_flag syntax element may be included in a set of VUI parameters, which may be included in an SPS. In HEVC WD7, when fixed_pic_rate_flag syntax element is equal to one, the temporal distance between the HRD output times of any two consecutive pictures in output order is constrained to equal to the determined clock tick subject to either of the following conditions being true: (1) the second picture is in the same coded video sequence as the first picture; or (2) the second picture is in a different coded video sequence than the first picture and fixed_pic_rate_flag is equal to 1 in the coded video sequence containing the second picture and the value of num_units_in_tick÷time_scale is the same for both coded video sequences. When the fixed_pic_rate_flag syntax element is equal to zero no such constraints apply to the temporal distance between the HRD output times of any two consecutive pictures (i.e., first and second picture) in output order. It should be noted that when fixed_pic_rate_flag is not present, it is inferred to be equal to 0. It should be noted that according to HEVC WD7, when fixed_pic_rate_flag is equal to 1, stream adaptation based on temporal scalability would require changing of the value of either time_scale or num_units_in_tick in the case where some highest temporal layers are discarded. It should be noted that HEVC WD7 provides the follow semantics for fixed_pic_rate_flag:

When fixed_pic_rate_flag is equal to 1 for a coded video sequence containing picture n, the value computed for $\Delta t_{o,dpb}(n)$ as specified in Equation C-13 shall be equal to $t_c$ as specified in Equation C-1 (using the value of $t_c$ for the coded video sequence containing picture n) when one or more of the following conditions are true for the following picture $n_n$ that is specified for use in Equation C-13:

picture $n_n$ is in the same coded video sequence as picture n.

picture $n_n$ is in a different coded video sequence and fixed_pic_rate_flag is equal to 1 in the coded video sequence containing picture $n_n$ and the value of num_units_in_tick÷time_scale is the same for both coded video sequences.

Wherein Equation C-1 corresponds to equation (1) and Equation C-13 is defined in HEVC WD7 as follows:

$$\Delta t_{o,dpb}(n) = t_{o,dpb}(n_n) - t_{o,dpb}(n) \qquad (2)$$

In view of the above-mentioned timing and random access characteristics associated with HEVC WD7, this disclosure describes techniques that may be used to reduce delay in video applications, such as conversational applications, and provide improvements in random access to a coded video sequence. In one example, this disclosure describes techniques for allocating NAL unit types. In another example, this disclosure describes for sub-picture level or decoding-unit level HRD behavior. In another example, this disclosure describes techniques for the referencing of parameter set IDs. In yet another example, this disclosure describes techniques for providing improved semantics for the fixed_pic_rate_flag syntax element. It should be noted that any and all combinations of these techniques and other techniques described herein may be incorporated into a video encoding and decoding system.

Figure 3:
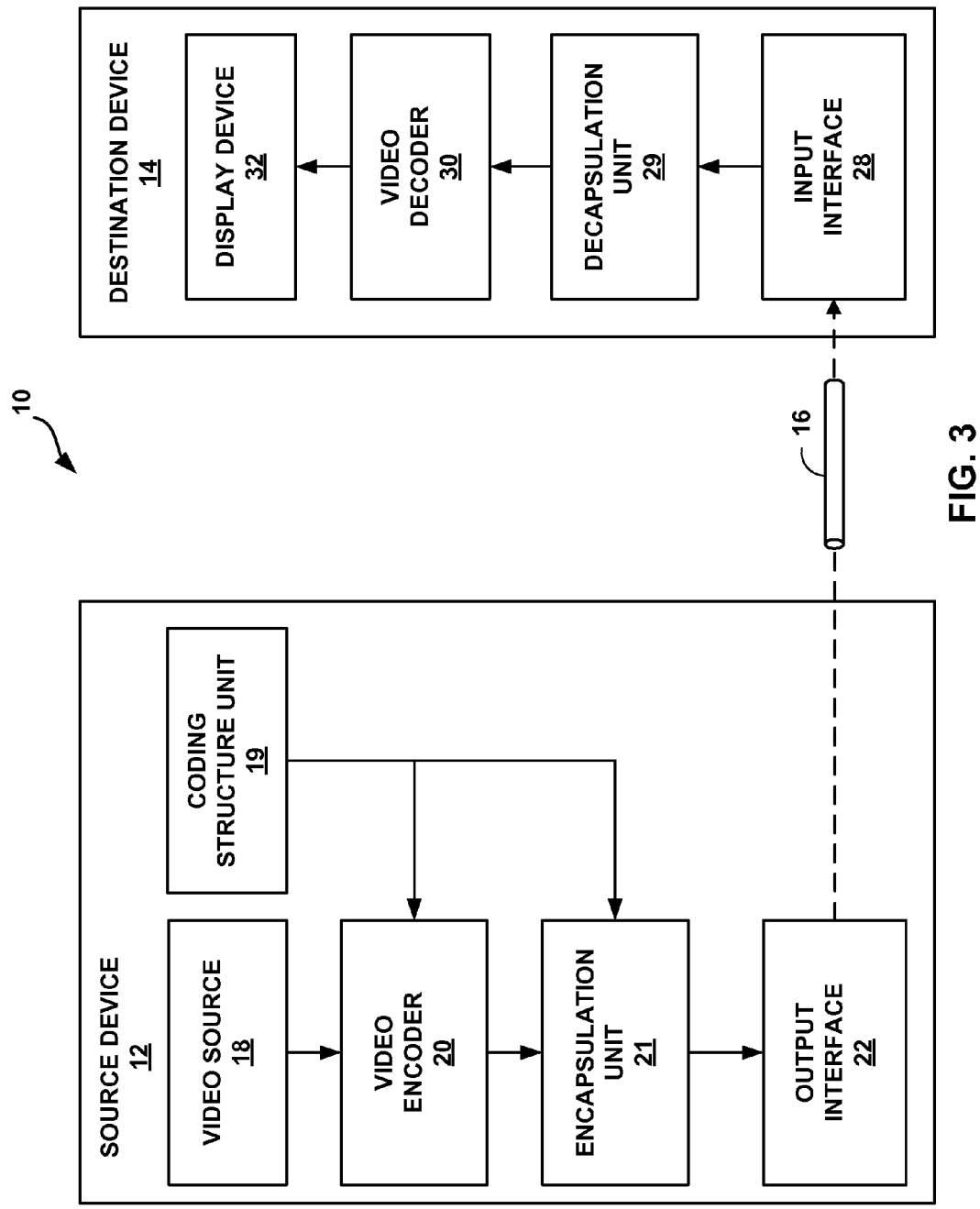
FIG. 3 is a block diagram illustrating an example video encoding and decoding system that may utilize the techniques described in this disclosure.

FIG. 3 is a block diagram illustrating an example video encoding and decoding system 10 that may utilize techniques described herein. In particular, video encoding and decoding system may utilize the techniques described herein related to (1) allocation of NAL unit types, (2) sub-picture level or decoding-unit level HRD behavior, (3) referencing of parameter set IDs, (4) improved semantics for fixed_pic_rate_flag, or any and all combinations of these techniques. Video encoding and decoding system 10 is an example of a video system that may be used for any of the following video applications: local playback, streaming, broadcast, multicast and/or conversational applications. Source device 12 and destination device 14 are examples of coding devices in which source device 12 generates encoded video data for transmission to destination device 14. In some examples, source devices 12 and destination device 14 may operate in a substantially symmetrical manner such that each of source device 12 and destination device 14 include video encoding and decoding components. Hence, system 10 may be configured to support one-way or two-way video transmission between source device 12 and destination device 14.

Although the techniques described herein are described in conjunction with source device 12 and destination device 14, the techniques may be performed by any digital video encoding and/or decoding device. The techniques of this disclosure may also be performed by a video preprocessor. Further, although the techniques of this disclosure are generally described as being performed by a video encoding device and video decoding device, the techniques may also be performed by a video encoder/decoder, typically referred to as a "CODEC." Thus, each of video encoder 20 and video decoder 30 in FIG. 3 may be included in one or more encoders or decoders, either of which may be integrated as part of a combined encoder/decoder (CODEC) in a respective device. Further, a device including video encoder 20 and/or video decoder 30 may comprise an integrated circuit, a microprocessor, and/or a wireless communication device, such as a cellular telephone. Although not shown in FIG. 3, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

As illustrated in FIG. 3, system 10 includes a source device 12 that provides encoded video data to be decoded at a later time by a destination device 14. In particular, source device 12 provides encoded video data to destination device 14 via a computer-readable medium 16. Destination device 14 may receive the encoded video data to be decoded via computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Computer-readable medium 16 may comprise any type of medium or device capable of moving the encoded video data from source device 12 to destination device 14. Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data.

In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

In the example of FIG. 3, source device 12 includes video source 18, coding structure unit 19, video encoder 20, encapsulation unit 21, and output interface 22. Destination device 14 includes input interface 28, decapsulation unit 29, video decoder 30, and display device 32. In other examples, source device 12 and destination device 14 may include other components or arrangements. For example, source device 12 may receive video data from an external video source 18, such as an external camera. Likewise, destination device 14 may interface with an external display device, rather than including an integrated display device. The components of source device 12 and destination device 14 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques described herein are implemented partially in software, a device may store instructions for the software in a suitable, non-transitory computer-readable medium and execute the instructions in hardware using one or more processors to perform the techniques.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be received by video encoder 20. Output interface 22 may be configured to output encoded video data, such as a coded video sequence, onto a computer-readable medium 16. In some examples, a coded video sequence may be output from output interface 22 to a storage device. Input interface 28 of destination device 14 receives the encoded video data from computer-readable medium 16. Display device 32 displays decoded video data to a user, and may comprise any of a variety of display devices such as a cathode ray tube (CRT), a liquid crystal display (LCD), a plasma display, an organic light emitting diode (OLED) display, or another type of display device.

Coding structure unit 19, video encoder 20, encapsulation unit 21, decapsulation unit 29, and video decoder 30 may operate according to a video coding standard, such as the upcoming HEVC described above and may generally conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. Coding structure unit 19, video encoder 20, encapsulation unit 21, decapsulation unit 29, and video decoder 30 may also operate according to a modified version of a video coding standard, wherein the modified version of the video coding standard is modified to include any and all combinations of the techniques described herein.

Video encoder 20 may divide a video frame or picture may into a series of equally-sized video blocks, such as a CU, described in HEVC WD7. A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs.

Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise. This disclosure uses the term "block" to refer to any of a CU, PU, or TU, in the context of HEVC, or similar data structures in the context of other standards (e.g., macroblocks and sub-blocks thereof in H.264/AVC).

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N>2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

As described above, a video sequence may be coded according to a determined video coding structure, where the coding structure defines the allocation of picture types (e.g., RAP and non-RAP pictures) used to encode a video sequence. For example, a video sequence may be encoded with RAP pictures included at predetermining intervals in order to facilitate random access of a video sequence. Such a coding structure may be useful for broadcast applications. Further, a video sequence may be encoded according to a coding structure that minimizes delay for low-delay applications. Coding structure unit 19 may be configured to determine a coding structure to be used by video encoder 20 for encoding a video sequence received from video source 18. In one example, coding structure unit 19 may store predefined coding structures that correspond to respective video applications. Coding structure unit 19 may be configured to output information indicating a particular coding structure to each of video encoder 20 and encapsulation unit 21. Video encoder 20 receives a video sequence from video source 18 and coding structure information from coding structure unit 19 and generates encoded video data. Encapsulation unit 21 receives encoded video data from video encoder 20 and information indicating a particular coding structure and generates a coded video sequence including access units. Decapsulation unit 29 may be configured to receive the coded video sequence and parse the access units and NAL units. Video decoder 30 may be configured to receive NAL units and reconstruct video data based on information included in the received NAL units.

It should be noted that coding structure unit 19 and/or video encoder 20 may be configured to generate syntax elements included in a parameter set. In some examples, coding structure unit 19 may be configured to generate syntax elements included in high level parameters sets, such as an SPS, and video encoder 20 may be configured to perform video encoding based on syntax elements received from coding unit structure, as well as, output entropy encoded syntax elements as part of encoded video data.

In accordance with the techniques of this disclosure, allocation of NAL unit types may be performed in a manner such that a device, such as destination device 14, can easily identify a RAP picture and associated timing information. In one example, IDR pictures with no associated leading pictures have a distinct NAL unit type from IDR pictures that may have associated leading pictures. For example, IDR pictures with no associated leading pictures have a NAL unit type M while IDR pictures that may have associated leading pictures have NAL unit type N, wherein M is not equal to N, as illustrated in Table 4. It should be noted that in the example illustrated in Table 4, leading pictures associated with an IDR picture may be DLP pictures. In one example, the NAL unit types illustrated in Table 4 may be incorporated into the HEVC WD7 NAL unit type codes and NAL unit type classes illustrated in Table 2. For example, the reversed NAL unit type values in Table 2 may be used for NAL unit types M and N in Table 4.

TABLE 4

| | Distinct IDR NAL Unit types | |
|---|---|---|
| M | Coded slice of an IDR picture with no associated leading pictures slice_layer_rbsp( ) | VCL |
| N | Coded slice of an IDR picture that may have associated leading pictures slice_layer_rbsp( ) | VCL |

In another example, CRA pictures with no associated leading pictures have a distinct NAL unit type different from CRA pictures that may have associated leading pictures. Furthermore, CRA pictures with no associated TFD pictures have a distinct NAL unit different from CRA pictures that may have associated TFD pictures. Accordingly, three different NAL unit types may be used for different types of CRA pictures, as illustrated in Table 5. In one example, the NAL unit types illustrated in Table 5 may be incorporated into the HEVC WD7 NAL unit type codes and NAL unit type classes illustrated in Table 2. For example, the reversed NAL unit type values in Table 1 may be used for NAL unit types X, Y, and Z in Table 5.

TABLE 5

| | Distinct CRA NAL Unit types | |
|---|---|---|
| X | Coded slice of a CRA picture with no associated leading pictures slice_layer_rbsp( ) | VCL |
| Y | Coded slice of a CRA picture that has no associated TFD (but may have associated DLP pictures) slice_layer_rbsp( ) | VCL |
| Z | Coded slice of CRA picture that may have associated TFD pictures slice_layer_rbsp( ) | VCL |

In another example, BLA pictures with no associated leading pictures may have a distinct NAL unit type different from BLA pictures that may have associated leading pictures. Furthermore, BLA pictures with no associated TFD pictures may have a distinct NAL unit different from BLA pictures that may have associated TFD pictures. Accordingly, three different NAL unit types may be used for different types of BLA, as illustrated in Table 6. In one example, the NAL unit types illustrated in Table 6 may be incorporated into the HEVC WD7 NAL unit type codes and NAL unit type classes illustrated in Table 2. For example, the reversed NAL unit type values in Table 2 may be used for NAL unit types A, B, and C in Table 6.

TABLE 6

| | Distinct BLA NAL Unit types | |
|---|---|---|
| A | Coded slice of a BLA picture with no associated leading pictures slice_layer_rbsp( ) | VCL |

TABLE 6-continued

Distinct BLA NAL Unit types

| | | |
|---|---|---|
| B | Coded slice of a BLA picture that has no associated TFD have associated DLP pictures) (but may slice_layer_rbsp( ) | VCL |
| C | Coded slice of BLA picture that may have associated TFD pictures slice_layer_rbsp( ) | VCL |

Any and all combinations of the NAL unit types described with respect to Tables 4-6 may be used for allocation of NAL unit types. In one example, all of the NAL unit types described with respect to Tables 4-6 may be used for the allocation of NAL unit types. Table 7 illustrates an example where all of the NAL types illustrated in Tables 4-6 are used for the allocation of NAL unit types. As illustrated in Table 7, NAL unit types in include the CRA picture, BLA picture, and IDR picture NAL unit types described with respect to Tables 4-6 as well as the VPS, SPS, PPS, and APS NAL units types described above. Table 7 can be contrasted with Table 2 above in that the allocation of NAL unit types provided in Table 7 includes multiple NAL unit types for IDR, CRA and BLA pictures, whereas the allocation of NAL unit types provided in Table 1 includes a single NAL unit type for each of IDR, CRA and BLA pictures.

TABLE 7

NAL unit type codes and NAL unit type classes

| nal_unit_type | Content of NAL unit and RBSP syntax structure | NAL unit type class |
|---|---|---|
| 0 | Unspecified | non-VCL |
| 1 | Coded slice of a non-RAP, non-TFD, non-DLP and non-TLA picture slice_layer_rbsp( ) | VCL |
| 2 | Coded slice of a TLA picture slice_layer_rbsp( ) | VCL |
| 3 | Coded slice of a TFD picture slice_layer_rbsp( ) | VCL |
| 4 | Coded slice of a DLP picture slice_layer_rbsp( ) | VCL |
| 5 | Coded slice of a CRA picture with no associated leading pictures slice_layer_rbsp( ) | VCL |
| 6 | Coded slice of a CRA picture that has no associated TFD (but may have associated DLP pictures) slice_layer_rbsp( ) | VCL |
| 7 | Coded slice of CRA picture that may have associated TFD pictures slice_layer_rbsp( ) | VCL |
| 8 | Coded slice of a BLA picture with no associated leading pictures slice_layer_rbsp( ) | VCL |
| 9 | Coded slice of a BLA picture that has no associated TFD (but may have associated DLP pictures) slice_layer_rbsp( ) | VCL |
| 10 | Coded slice of BLA picture that may have associated TFD pictures slice_layer_rbsp( ) | VCL |
| 11 | Coded slice of an IDR picture with no associated leading pictures slice_layer_rbsp( ) | VCL |
| 12 | Coded slice of an IDR picture that may have associated leading pictures slice_layer_rbsp( ) | VCL |
| 13 ... 24 | Reserved | n/a |
| 25 | Video parameter set video_parameter_set_rbsp( ) | non-VCL |
| 26 | Sequence parameter set seq_parameter_set_rbsp( ) | non-VCL |
| 27 | Picture parameter set pic_parameter_set_rbsp( ) | non-VCL |

TABLE 7-continued

NAL unit type codes and NAL unit type classes

| nal_unit_type | Content of NAL unit and RBSP syntax structure | NAL unit type class |
|---|---|---|
| 28 | Adaptation parameter set aps_rbsp( ) | non-VCL |
| 29 | Access unit delimiter access_unit_delimiter_rbsp( ) | non-VCL |
| 30 | Filler data filler_data_rbsp( ) | non-VCL |
| 31 | Supplemental enhancement information (SEI) sei_rbsp( ) | non-VCL |
| 32 ... 47 | Reserved | n/a |
| 48 ... 63 | Unspecified | non-VCL |

Encapsulation unit 21 may be configured to receive encoded video data from video encoder 20 and information indicating a particular coding structure and generate a coded video sequence including access units based on the allocation of NAL unit types illustrated in any and all of combinations of NAL unit allocations illustrated in Tables 2-7. Further, decapsulation unit 29 may be configured to receive the coded video sequence and parse the access units and NAL units, where the NAL units are allocated based on any and all of combinations of NAL unit allocations illustrated in Tables 2-7.

As described above, according to HEVC WD7, in order for the current picture timing SEI message and the mechanism to enable both AU-level and DU-level HRD CPB removal at the same time to achieve sub-picture delay, DUs must be sent out before the entire AU is encoded, and the AU-level SEI messages cannot yet be sent out before the entire AU is encoded. In accordance with the techniques of this disclosure, encapsulation unit 21 and decapsulation unit 29 may be configured such that sub-picture level or decoding-unit level HRD behavior may be modified compared to HEVC WD7.

For example, encapsulation unit 21 may be configured such that AU-level SEI messages are sent after the entire AU is encoded. Such an AU-level SEI message may be included in an SEI NAL unit with a distinct NAL unit type. One difference between such an SEI NAL unit and existing definitions of SEI NAL units, e.g., as defined in HEVC WD7, is that this distinct SEI NAL unit type may be allowed succeed the last VCL NAL unit in the same AU in decoding order, and may be constrained such that it shall not precede the first VCL NAL unit in the same AU in decoding order. Conventional SEI NAL units and SEI messages may be respectively referred to as prefix SEI NAL units and prefix SEI messages, while the distinct SEI NAL unit and SEI message described herein may be respectively referred to as suffix SEI NAL units and suffix SEI messages.

In addition to being configured to generate a coded video sequence based on any and all combinations of NAL unit allocations illustrated in Tables 2-7, encapsulation unit 21 may be configured to generate a coded video sequence including prefix and suffix SEI NAL units. Likewise, decapsulation unit 29 may be configured to receive a coded video sequence and parse the access units and NAL units, where the NAL units include prefix and suffix SEI NAL unit types. That is, decapsulation unit 29 may be configured to extract the suffix SEI NAL units from access units. Table 8 illustrates an example where all of the NAL types illustrated in Tables 4-6 are used for the allocation of NAL unit types, as well as prefix and suffix SEI NAL units.

TABLE 8

NAL unit type codes and NAL unit type classes

| nal_unit_type | Content of NAL unit and RBSP syntax structure | NAL unit type class |
|---|---|---|
| 0 | Unspecified | non-VCL |
| 1 | Coded slice of a non-RAP, non-TFD, non-DLP and non-TLA picture slice_layer_rbsp( ) | VCL |
| 2 | Coded slice of a TLA picture slice_layer_rbsp( ) | VCL |
| 3 | Coded slice of a TFD picture slice_layer_rbsp( ) | VCL |
| 4 | Coded slice of a DLP picture slice_layer_rbsp( ) | VCL |
| 5 | Coded slice of a CRA picture with no associated leading pictures slice_layer_rbsp( ) | VCL |
| 6 | Coded slice of a CRA picture that has no associated TFD (but may have associated DLP pictures) slice_layer_rbsp( ) | VCL |
| 7 | Coded slice of CRA picture that may have associated TFD pictures slice_layer_rbsp( ) | VCL |
| 8 | Coded slice of a BLA picture with no associated leading pictures slice_layer_rbsp( ) | VCL |
| 9 | Coded slice of a BLA picture that has no associated TFD (but may have associated DLP pictures) slice_layer_rbsp( ) | VCL |
| 10 | Coded slice of BLA picture that may have associated TFD pictures slice_layer_rbsp( ) | VCL |
| 11 | Coded slice of an IDR picture with no associated leading pictures slice_layer_rbsp( ) | VCL |
| 12 | Coded slice of an IDR picture that may have associated leading pictures slice_layer_rbsp( ) | VCL |
| 13 ... 24 | Reserved | n/a |
| 25 | Video parameter set video_parameter_set_rbsp( ) | non-VCL |
| 26 | Sequence parameter set seq_parameter_set_rbsp( ) | non-VCL |
| 27 | Picture parameter set pic_parameter_set_rbsp( ) | non-VCL |
| 28 | Adaptation parameter set aps_rbsp( ) | non-VCL |
| 29 | Access unit delimiter access_unit_delimiter_rbsp( ) | non-VCL |
| 30 | Filler data filler_data_rbsp( ) | non-VCL |
| 31 | Prefix Supplemental enhancement information (SEI) sei_rbsp( ) | non-VCL |
| 32 | Suffix Supplemental enhancement information (SEI) sei_rbsp( ) | non-VCL |
| 33 ... 47 | Reserved | n/a |
| 48 ... 63 | Unspecified | non-VCL |

As described above, in addition to SEI NAL units non-VCL NAL unit types include VPS, SPS, PPS, and APS NAL units. According to the defined parameter set types in HEVC WD7, each SPS refers to a VPS ID, each PPS refers to an SPS ID, and each slice header refers to a PPS ID and possibly an APS ID. Video encoder 20 and/or coding structure unit 19 may be configured to generate parameter sets according to the defined parameter sets in HEVC WD7. In addition, video encoder 20 and/or coding structure unit 19 may be configured to generate parameter sets where the VPS ID and SPS ID (e.g., with VPS ID preceding the SPS ID) may be optionally signaled in the slice headers. In one example where the VPS ID and SPS ID are signaled in a slice header, no VPS ID will be located in SPS and no SPS ID will be located in PPS. Further, in one example, the VPS ID and SPS ID may be present in the slice headers of each RAP picture and each picture may be associated with a recovery point SEI message. Further, in other examples, the VPS ID and SPS ID may be present in the slice header for other pictures.

Figure 4:
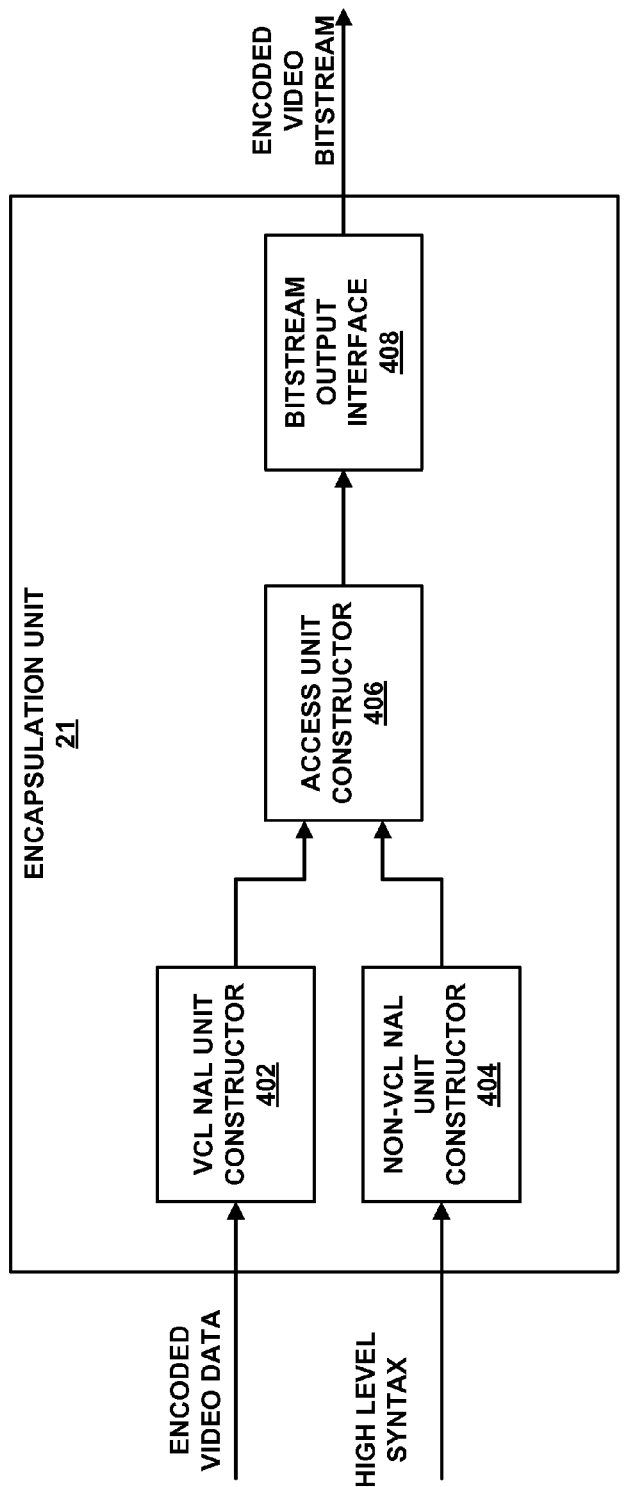
FIG. 4 is a block diagram illustrating an example encapsulation unit that may implement the techniques described in this disclosure.

FIG. 4 is a block diagram illustrating an example encapsulation unit that may implement the techniques described in this disclosure. In the example illustrated in FIG. 4, encapsulation unit 21 includes VCL NAL unit constructor 402, non-VCL NAL unit constructor 404, access unit constructor 406, and bitstream output interface 408. Encapsulation unit 21 receives encoded video data and high-level syntax and outputs an encoded video bitstream. Encoded video data may include residual video data and syntax data associated with a slice. High-level syntax data may include, for example, syntax elements included in a parameter set, SEI messages, or other syntax elements defined by a video coding standard such as the upcoming HEVC standard. An encoded video bitstream may include one or more coded video sequences and may generally conform to a video coding standard, such as the upcoming HEVC standard. As described above, VCL NAL units include a slice of video data. VCL NAL unit constructor 402 may be configured to receive slices of encoded video data and generate VCL NAL units based on the type of picture including a slice. VCL NAL unit constructor 402 may be configured to generate VCL NAL units according to any and all combinations of the NAL allocations described above with respect to Tables 2-8. VCL NAL unit constructor 402 may be configured to include a header in the VCL NAL unit where the header identifies the type of VCL NAL unit.

For example, VCL NAL unit constructor 402 may be configured to receive a slice of video data included in an IDR picture and (1) if the IDR picture has no associated leading pictures, encapsulate the slice of video data in a NAL unit with a type that indicates that the IDR picture has no leading pictures, or (2) if the IDR picture has associated leading pictures, encapsulate the slice of video data in a NAL unit with a type that indicates that the IDR picture has leading pictures. VCL NAL unit constructor 402 may be configured to receive a slice of video date included in an CRA picture and (1) if the CRA picture has no associated leading pictures, encapsulate the slice of video data in a NAL unit with a type that indicates that the CRA picture has no leading pictures, or (2) if the CRA picture has associated leading pictures, encapsulate the slice of video data in a NAL unit with a type that indicates that the CRA picture has leading pictures. Further, if the leading pictures associated with the CRA picture are TFD pictures, VCL NAL unit constructor 402 may be configured to encapsulate a slice of video data in a NAL unit with a type that indicates that the leading picture associated with the CRA pictures are TFD.

Further, if the leading pictures associated with the CRA picture are not TFD pictures, VCL NAL unit constructor 402 may be configured to encapsulate the slice of video date in a NAL unit with a type that indicates that the leading picture associated with the CRA pictures are not TFD. Further, VCL NAL unit constructor 402 may be configured to receive a slice of video date included in an BLA picture and (1) if the BLA picture has no associated leading pictures, encapsulate the slice of video data in a NAL unit with a type that indicates that the BLA picture has no leading pictures, or (2) if the BLA picture has associated leading pictures, encapsulate the slice of video data in a NAL unit with a type that indicates that the BLA picture has leading pictures. Further, if the leading pictures associated with the BLA picture are TFD pictures, VCL NAL unit constructor 402 may be configured to encapsulate a slice of video data in a NAL unit with a type that indicates that the leading picture associated with the BLA pictures are TFD. Further, if the leading pictures associated with the BLA picture are not TFD pictures, VCL NAL unit constructor 402 may be configured to encapsulate the slice of video date in a NAL unit with a type that indicates that the leading picture associated with the BLA pictures are not TFD.

Figure 5:
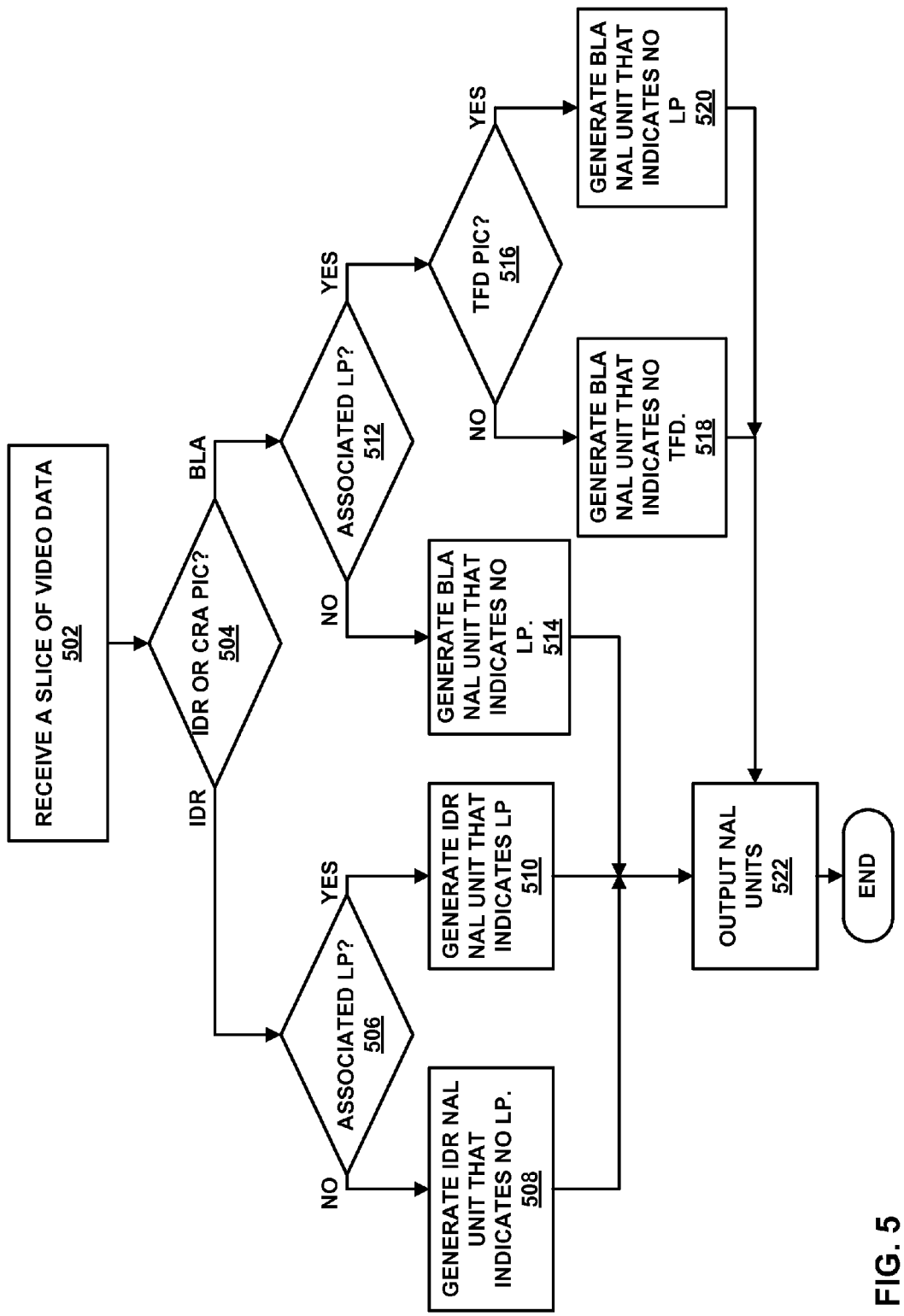
FIG. 5 is a flowchart illustrating an example of generating VCL NAL units according to the techniques of this disclosure.

FIG. 5 is a flowchart illustrating an example of generating VCL NAL units according to the techniques of this disclosure. Although the example of generating VCL NAL units illustrated in FIG. 5 is described as being performed by VCL NAL unit constructor 402, any combination of source device 12, video encoder 20, encapsulation unit 21, and combinations of components thereof may perform the example of generating VCL NAL units illustrated in FIG. 5. As illustrated in FIG. 5, VCL NAL unit constructor 402 receives a slice of video data (502). The slice of video data may be encoded video data encoded according to any of the encoding techniques described herein. The slice of video data may be included in one of the picture types described herein. VCL NAL unit constructor 402 determines whether the slice of video data is included in an IDR or CRA picture (504).

If the slice of video data is included in an IDR picture ("IDR" branch of 504), VCL NAL unit constructor 402 determines whether the IDR picture has associated leading pictures (506). If the IDR picture does not have associated leading pictures ("NO" branch of 506), VCL NAL unit constructor 402 generates a VCL NAL unit that indicates that the IDR picture does not have associated leading pictures (508). If the IDR picture has associated leading pictures ("YES" branch of 506), VCL NAL unit constructor 402 generates a VCL NAL unit that indicates that the IDR picture has associated leading pictures (510).

If the slice of video data is included in a CRA picture, VCL NAL unit constructor 402 determines whether the CRA picture has associated leading pictures (512). If the CRA picture does not have associated leading pictures ("NO" branch of 512), VCL NAL unit constructor 402 generates a VCL NAL unit that indicates that the CRA picture does not have associated leading pictures (514). If the CRA picture has associated leading pictures ("YES" branch of 512), VCL NAL unit constructor 402 determines whether the associated leading pictures are TFD pictures (516).

If the associated leading pictures of the CRA picture are TFD pictures ("YEAS" branch of 516), VCL NAL unit constructor 402 generates a VCL NAL unit that indicates that the associated leading pictures of the CRA are TFD pictures (518). If the associated leading pictures of the BLA picture are not TFD pictures ("NO" branch of 516), VCL NAL unit constructor 402 generates a VCL NAL unit for that indicates that the associated leading pictures are not TFD pictures (520).

VCL NAL unit constructor 402 may generate NAL units by encapsulating slice data in a NAL unit and including a NAL unit type value in a NAL unit header. Each NAL unit type value may correspond to a respective NAL unit type. In one example, the NAL unit type values may be defined according to Table 7. The generated NAL units may be output by NAL unit constructor 402 to access unit constructor 406 for inclusion in an access unit (522).

In this manner, encapsulation unit 21 represents an example of a device for generating a bitstream including video data, the device including a processor configured to determine whether a random access point (RAP) picture is of a type that can have associated leading pictures and whether the RAP picture comprises an instantaneous decoder refresh (IDR) picture or a clean random access (CRA) picture, encapsulate a slice of the RAP picture in a network abstraction layer (NAL) unit, wherein the NAL unit includes a NAL unit type value that indicates whether the RAP picture is of a type that can have associated leading pictures, and generate a bitstream including the NAL unit.

Likewise, the method of FIG. 5 represents an example of a method of generating a bitstream including video data, the method including determining whether a random access point (RAP) picture is of a type that can have associated leading pictures and whether the RAP picture comprises an instantaneous decoder refresh (IDR) picture or a clean random access (CRA) picture, encapsulating a slice of the RAP picture in a network abstraction layer (NAL) unit, wherein the NAL unit includes a NAL unit type value that indicates whether the RAP picture is of a type that can have associated leading pictures, and generating a bitstream including the NAL unit.

Referring again to FIG. 4, non-VCL NAL unit constructor 404 may be configured to receive high-level syntax elements, such as syntax elements included in the parameter sets and SEI messages, as described above and generate non-VCL NAL units based on any and all combinations of the NAL unit allocations described above with respect to Tables 2-8. Non-VCL NAL unit constructor 404 may be configured to generate non-VCL NAL units by encapsulating syntax data in a NAL unit and including a NAL unit type value in a NAL unit header. For example, non-VCL NAL constructor may be configured to receive syntax elements including in a parameter set and include a NAL unit type value indicating the parameter set type in the NAL unit header.

Further, non-VCL NAL unit constructor 404 may be configured to receive AU-level SEI messages and generate SEI message NAL units. In one example, non-VCL NAL unit constructor 404 may be configured to generate two types of SEI message NAL units, where a first type of SEI NAL unit indicates that such a SEI NAL unit may succeed the last VCL NAL unit in an access unit in decoding order and second type of SEI NAL units indicates that such a SEI NAL unit may not succeed the last VCL NAL unit in an access unit in decoding order. Further, the first type of SEI NAL may be constrained such that it may not be allowed to precede the first VCL NAL unit in the same access unit in decoding order. The first type of NAL unit may be referred to as suffix SEI NAL units and the second type of NAL units may be referred to as prefix SEI NAL units. Non-VCL NAL unit constructor 404 outputs non-VCL NAL units to access unit constructor 406.

Access unit constructor 406 may be configured to receive VCL NAL units and non-VCL NAL units and generate access units. Access unit constructor 406 may receive any type of NAL unit defined in Tables 2-8. VCL-Access unit constructor 406 may be configured to generate access units based on any and all combinations of NAL unit types described herein. As described above, according to HEVC WD7, an access unit is a set of NAL units that are consecutive in decoding order and contain one coded picture. Thus, access unit constructor 406 may be configured to receive a plurality of NAL units and arrange the plurality of NAL units according to a decoding order. Further, access unit constructor 406 may be configured to arrange a suffix SEI NAL unit, as described above, such that it succeeds the last VCL NAL unit in an access unit and/or does not precede the first VCL NAL unit in the same access unit.

Figure 6:
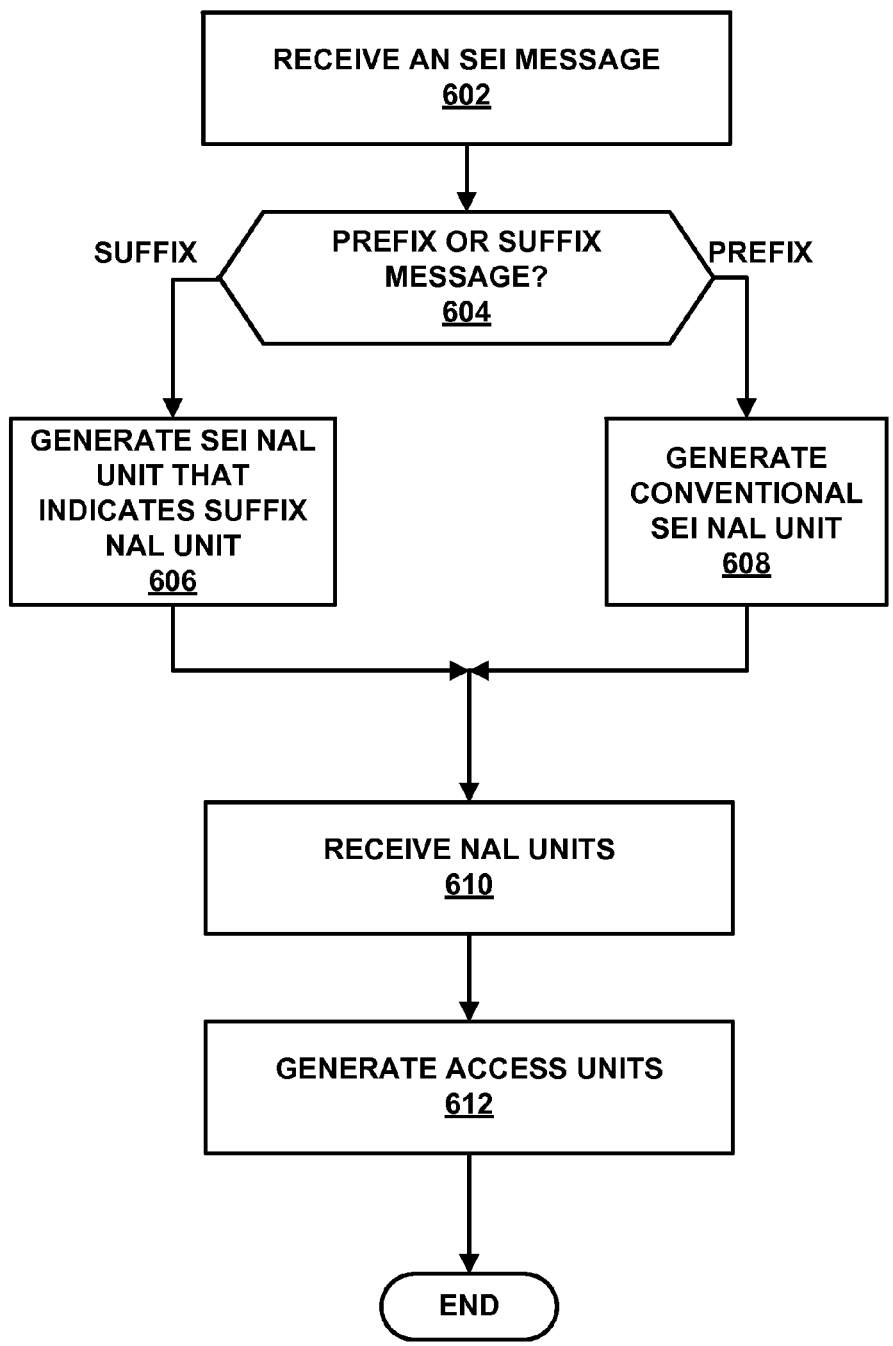
FIG. 6 is a flowchart illustrating an example of generating non-VCL NAL units according to the techniques of this disclosure.

FIG. 6 is a flowchart illustrating an example of generating non-VCL NAL units according to the techniques of this disclosure. Although the example of generating non-VCL NAL units illustrated in FIG. 6 is described as being performed by non-VCL NAL unit constructor 404 and access unit constructor 406, any combination of source device 12, video encoder 20, encapsulation unit 21, and combinations of components thereof may perform the example of generating non-VCL NAL units illustrated in FIG. 6.

As shown in FIG. 6, non-VCL NAL unit constructor 404 receives an SEI message (602). The SEI message may be any type of SEI message described above with respect to Table 1. Non-VCL NAL unit constructor 404 determines whether the SEI message is a prefix SEI message or a suffix SEI message (604).

If the SEI message is a suffix SEI message ("SUFFIX" branch of 604), non-VCL NAL unit constructor 404 generates a type value for an SEI NAL unit that indicates that the SEI NAL unit is a suffix SEI message (606). If the SEI message is a prefix SEI message ("PREFIX" branch of 604), non-VCL NAL unit constructor 404 generates a type value for an SEI NAL unit that indicates that the SEI NAL unit is a conventional SEI message (608).

Access unit constructor 406 receives the generated NAL units, which may include any combination of the types of NAL units described above with respect to Tables 2-8 (610). Access unit constructor 406 generates access units included the received NAL units (612). If the generated access unit includes a suffix SEI NAL unit, the NAL units of the access unit may arranged such that the suffix SEI NAL does not precede the first VCL NAL unit in the same access unit, but may succeed the last VCL NAL unit in an access unit in decoding order.

In this manner, encapsulation unit 21 represents an example of a processor configured to determine whether a supplemental enhancement information (SEI) message is a prefix SEI message or a suffix SEI message, wherein the SEI message includes data related to encoded video data, encapsulate the SEI message in an SEI NAL unit, wherein the SEI NAL unit includes a NAL unit type value that indicates whether the SEI NAL unit is a prefix SEI NAL unit or a suffix SEI NAL unit and whether the SEI message is a prefix SEI message or a suffix SEI message, and generate a bitstream including at least the SEI NAL unit.

Likewise, the method of FIG. 6 represents an example of a method of generating a bitstream including video data, the method including determining whether a supplemental enhancement information (SEI) message is a prefix SEI message or a suffix SEI message, wherein the SEI message includes data related to encoded video data, encapsulating the SEI message in an SEI NAL unit, wherein the SEI NAL unit includes a NAL unit type value that indicates whether the SEI NAL unit is a prefix SEI NAL unit or a suffix SEI NAL unit and whether the SEI message is a prefix SEI message or a suffix SEI message, and generating a bitstream including at least the SEI NAL unit.

Referring again to FIG. 4, bitstream output interface 408 may be configured to receive access units and generate a coded video sequence. Bitstream output interface 408 may be further configured output a coded video sequence as part of an encoded video bitstream, where an encoded video bitstream includes one or more coded video sequences based on any and all combinations of NAL unit types described herein. As described above, according to HEVC WD7, a coded video sequence is a set of access units that are consecutive in decoding order. Thus, bitstream output interface 408 may be configured to receive a plurality of access units and arrange the plurality of access units according to a decoding order.

As described above, coding structure unit 19 and/or video encoder 20 may be configured to generate syntax elements included in a parameter set including the fixed_pic_rate_flag syntax element which may be included in a set of VUI parameters, which may be included in an SPS, as provided in HEVC WD7. In addition, coding structure unit 19 and/or video encoder 20 may be configured to generate the fixed_pic_rate_flag syntax element, where the fixed_pic_rate_flag syntax element includes semantics that are modified from those provided in HEVC WD7. For example, according to the current semantics of fixed_pic_rate_flag in HEVC WD7, when fixed_pic_rate_flag is equal to 1, it is required that the difference between the presentation times of two pictures continuous in output order is equal to the clock tick. However, this would require changing of the value of either time_scale or num_units_in_tick when some highest temporal layers are discarded for stream adaptation based on temporal scalability.

In one example, instead of requiring the delta (that is, the difference between the presentation times of two pictures continuous in output order) to be exactly equal to clock tick, the delta may be required to be an integer number of clock tick(s). In this manner, coding structure unit 19 and/or video encoder 20 may be configured to generate the fixed_pic_rate_flag syntax element such that when fixed_pic_rate_flag is equal to 1, it is required that the difference between the presentation times of two pictures continuous in output order is equal to an integer of the clock tick.

In another example, coding structure unit 19 and/or video encoder 20 may be required to signal a fixed_pic_rate_flag for each temporal layer. Further, in this example, if fixed_pic_rate_flag for a particular temporal layer is equal to 1, i.e., the temporal layer representation has a constant picture rate, a value N may be signaled, and the delta (between the presentation times of two pictures continuous in output order) for the temporal layer representation may be equal to N clock ticks.

In another example, coding structure unit 19 and/or video encoder 20 may be configured to optionally signal a fixed_pic_rate_flag for each temporal layer. In this example, if fixed_pic_rate_flag for a particular layer is present and equal to 1, i.e., the temporal layer representation has a constant picture rate, a value N may be signaled and the delta (between the presentation times of two pictures continuous in output order) for the temporal layer representation is equal to N clock ticks. In the case where fixed_pic_rate_flag is optionally signaled for each temporal layer, assuming the fixed_pic_rate_flag is signaled for the highest temporal layer and the value is equal to 1, then for each particular temporal layer that has no fixed_pic_rate_flag signaled, the value of fixed_pic_rate_flag may be derived to be equal to the fixed_pic_rate_flag signaled for the highest temporal layer), and the value of N is derived to be equal to $2^{max\_Tid-currTid}$, wherein max_Tid is equal to the highest temporal_id value, and currTid is equal to the temporal_id of the particular temporal layer.

Figure 7:
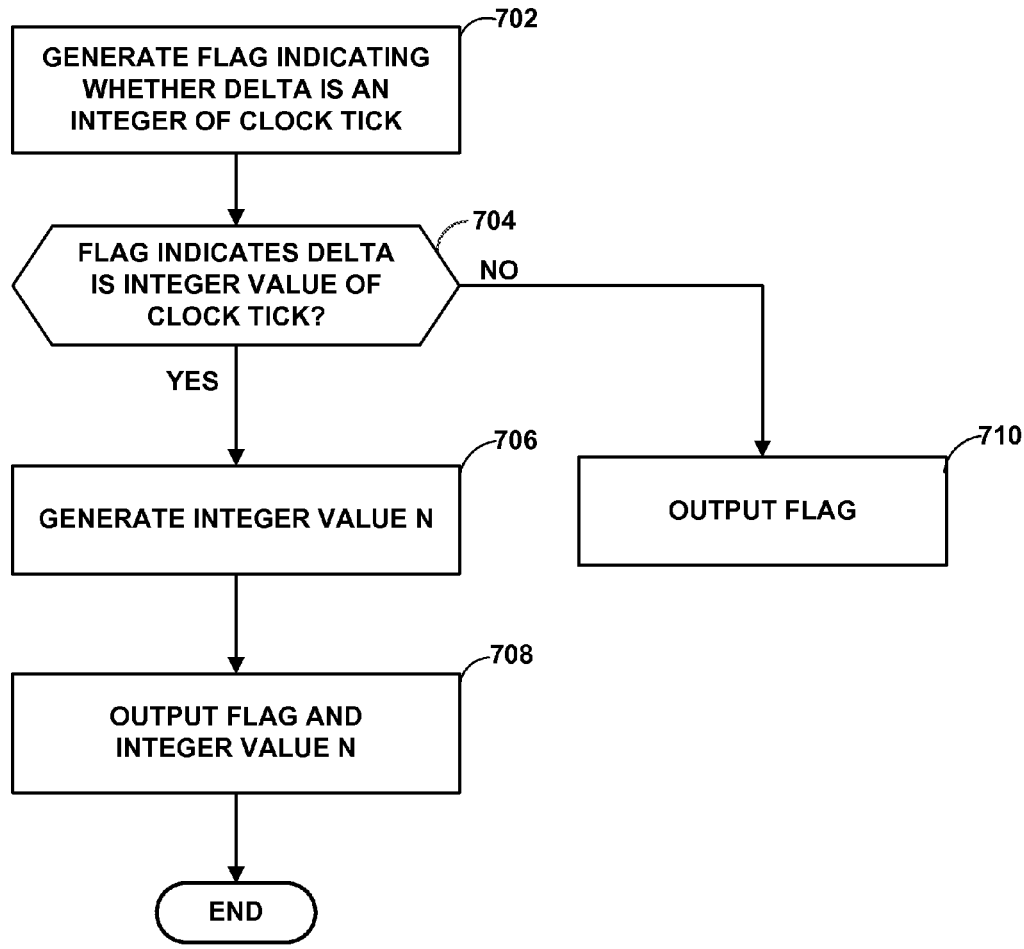
FIG. 7 is a flowchart illustrating an example of signaling a presentation time delta value.

FIG. 7 is a flowchart illustrating an example of signaling a presentation time delta value. Although the example of signaling a presentation time delta value illustrated in FIG. 7 is described as being performed by encapsulation unit 21 any combination of source device 12, video encoder 20, encapsulation unit 21, and combinations of components thereof may perform the example of signaling the presentation time delta value illustrated in FIG. 7.

As illustrated in the example of FIG. 7, encapulsation unit 21 generates a flag indicating whether a delta between a presentation time (e.g., a POC value) of a first picture and a presentation time of a second picture is an integer of a clock tick value (702). In other words, encapsulation unit 21 may generate data indicating whether a difference (e.g., the delta) between presentation times of a first picture and a second picture is an integer multiple of the clock tick value. The flag described in FIG. 7 represents an example of such generated data. In some cases, encapsulation unit 21 may receive a value for the flag from coding structure unit 19 or video encoder 20. The flag may be any of the fixed_pic_rate_flag syntax elements described above.

In one example, encapsulation unit 21 determines whether a value for the flag may indicate that the delta is an integer of the clock tick value (704). When the flag indicates that the delta is an integer value of the clock tick ("YES" branch of 704), encapsulation unit 21 may generate an integer value N (706) representative of the integer multiple of the clock tick value. The integer value N may be used by a decoding device, such as destination device 14, to determine the delta value where the delta is an integer multiple of the clock tick value. In one example, integer value N may have be a value of 0 to 2047 and may indicate a value of one less than the integer of clocks that the delta is equal to. Encapsulation unit 21 may then outputs the flag and the integer value N as part of a bitstream (708).

On the other hand, when encapsulation unit 21 determines that the flag indicates that the delta value is not an integer multiple of the clock tick ("NO" branch of 704), encapsulation unit 21 may simply output the flag (710).

In this manner, source device 12 represents an example of a processor configured to generate data indicating whether a difference between a presentation time of a first picture and a presentation time of a second picture is an integer multiple of a clock tick value, and, when the data indicates that the difference is the integer multiple of the clock tick value, generate data representative of the integer multiple.

Likewise, the method of FIG. 7 represents an example of a method for generating a bitstream including video data, the method including generating data indicating whether a difference between a presentation time of a first picture and a presentation time of a second picture is an integer multiple of a clock tick value, and, when the data indicates that the difference is the integer multiple of the clock tick value, generating data representative of the integer multiple.

Figure 8:
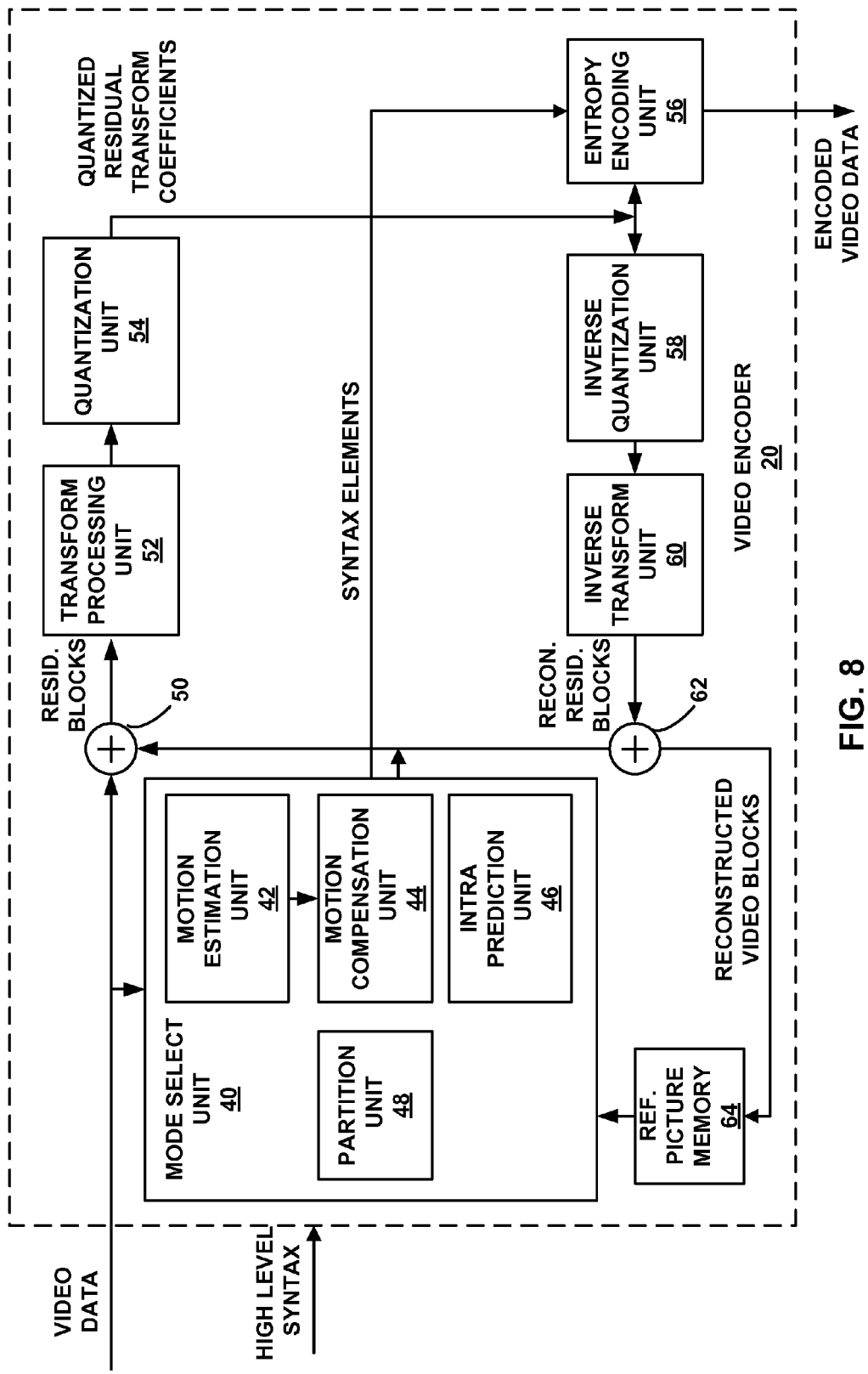
FIG. 8 is a block diagram illustrating an example video encoder that may implement the techniques described in this disclosure.

As described above, encapsulation unit 21 receives encoded video data. FIG. 8 is a block diagram illustrating an example of video encoder 20 that may generate encoded video data. As shown in FIG. 8, video encoder 20 receives video data and high-level syntax data. Video encoder 20 typically operates on video blocks within individual video slices in order to encode the video data. A video block may correspond to a coding node within a CU. The video blocks may have fixed or varying sizes, and may differ in size according to a specified coding standard. Video encoder 20 may further generate syntax data, such as block-based syntax data, frame-based syntax data, and GOP-based syntax data, e.g., in a frame header, a block header, a slice header, or a GOP header. The GOP syntax data may describe a number of frames in the respective GOP, and the frame syntax data may indicate an encoding/prediction mode used to encode the corresponding frame.

In the example of FIG. 8, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 8) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

As described above, decapsulation unit 29 may be configured to receive the coded video sequence and parse the access units and NAL units, where the NAL units are allocated based on any and all of combinations of NAL unit allocations illustrated in Tables 2-7. Further, decapsulation unit 29 and video decoder 30 may reconstruct video data based on the NAL unit type allocations. In one example, decapsulation unit 29 may be configured to receive a NAL unit, wherein the NAL unit includes a NAL type value and determine whether the NAL unit encapsulates an encoded slice of video data included in a RAP picture associated with a leading picture based on the NAL type value, and video decoder 30 may be configured reconstruct video data based on whether the NAL unit encapsulates an encoded slice of video data included in a RAP picture with an associated a leading picture. In another example, decapsulation unit 29 may be configured to receive a NAL unit, wherein the NAL unit includes a NAL type value and determine whether the NAL unit encapsulates an AU-level SEI message based on the NAL type value, and video decoder 30 may be configured to reconstruct video data based on whether the NAL unit encapsulates an AU-level SEI message. In some cases, reconstructing video data may include generating a spliced bitstream, as described above, and video decoder 30 may determine presentation times of pictures in the spliced video stream based on the NAL unit type determinations.

Further as described above, a source device, such as source device 12, may be configured to signal delta between a presentation time of a first picture and a presentation time of a second picture, where the signaling uses any of the may be any of the fixed_pic_rate_flag syntax elements described above. Thus, destination device 14, decapsulation unit 29, and video decoder 30 may be configured to determine the presentation times of a first picture and a second picture and present the pictures accordingly.

Figure 9:
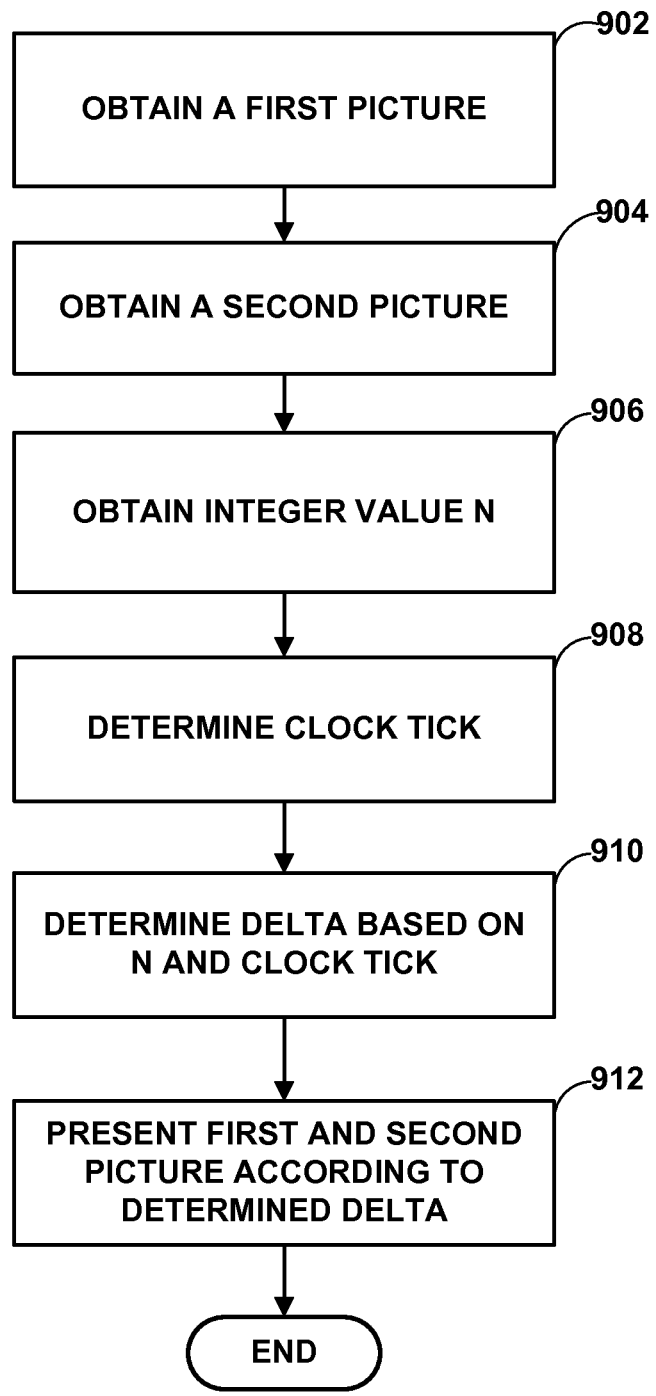
FIG. 9 is a flowchart illustrating an example of determining a presentation time delta value.

FIG. 9 is a flowchart illustrating an example method of determining a presentation time delta value. Although the example of signaling a presentation time delta value illustrated in FIG. 9 is described as being performed by decapsulation unit 29 any combination of destination device 14, video decoder 30, decapsulation unit 29, and combinations of components thereof may perform the example of determining a presentation time delta value illustrated in FIG. 9. As illustrated in FIG. 9, decapsulation unit 29 obtains a first picture (902). The first picture may be an encoded picture corresponding to an access unit. Decapsulation unit 29 obtains a second picture (904). The second picture may be an encoded picture corresponding to an access unit. The second picture may be includes in the same temporal layer as the first picture. Further, the first and second picture may be included in a highest temporal layer of video data.

Decapsulation unit 29 may then obtain an integer value N (906). This is assuming that decapsulation unit 29 had previously obtained data, such as a value for a flag, indicating that The integer value N may be includes in a set of VUI parameters, which may be included in an SPS. Decapsulation unit 29 determines a clock tick value (908). Decapsulation unit 29 may determine the clock tick value based on time_scale and num_units_in_tick syntax elements according to equation (1) described above.

Decapsulation unit 29 may then determine a delta between a presentation time of the first picture and a presentation time of the second picture (910). The delta may be equal to an integer of the clock tick value based on the integer value N. For example delta may be equal to (N+1)*clock tick.

Decapsulation unit 29 and video decoder 30 may then present the first picture and the second picture according to the determined delta (912). In one example, decapsulation unit 29 may signal the delta value to video decoder 30 and video decoder 30 may perform a decoding process based on the delta value. In this manner, destination device 14 represents an example of a device including a processor configured to determine a difference value between a presentation time of a first picture and a presentation time of a second picture, wherein the difference value is equal to an integer value multiplied by a clock tick value, and present the first picture and the second picture according to the determined difference value.

Likewise, the method of FIG. 9 represents an example of a method including determining a difference value between a presentation time of a first picture and a presentation time of a second picture, wherein the difference value is equal to an integer value multiplied by a clock tick value, and presenting the first picture and the second picture according to the determined difference value.

Figure 10:
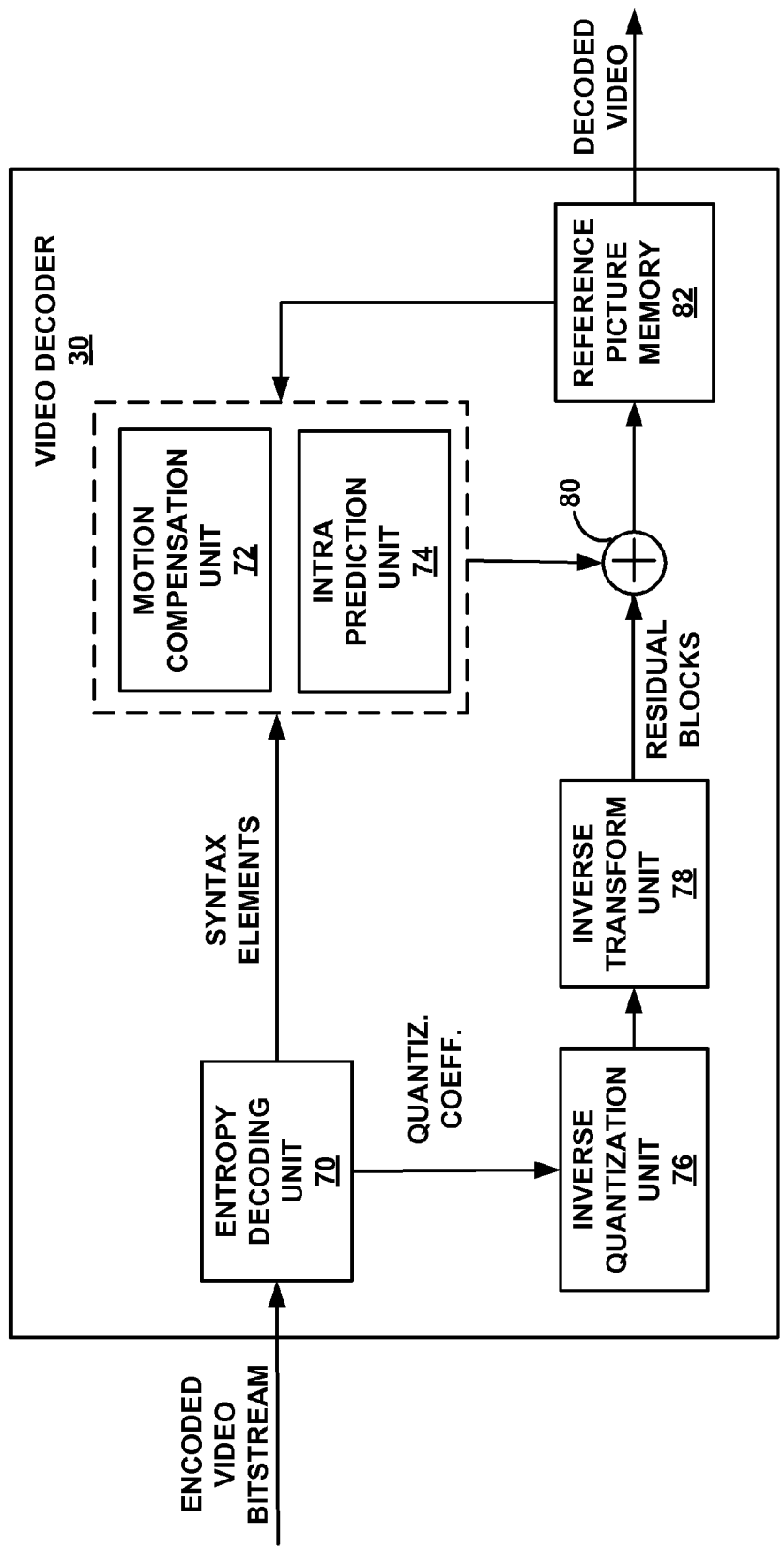
FIG. 10 is a block diagram illustrating an example video decoder that may implement the techniques described in this disclosure.

FIG. 10 is a block diagram illustrating an example of video decoder 30 that may implement techniques for (1) receiving data that includes NAL unit types, (2) processing received sub-picture level or decoding-unit level HRD behavior, (3) process data including reference to parameter set IDs, (4) process received data including improved semantics for fixed_pic_rate_flag, or any and all combinations of these. In the example of FIG. 10, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 3.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a first value of a first network abstraction layer (NAL) unit type for a first supplemental enhancement information (SEI) NAL unit of a bitstream and a second value of a second NAL unit type for a second SEI NAL unit of the bitstream, wherein the first NAL unit type value for the first SEI NAL unit indicates that the first SEI NAL unit comprises a prefix SEI NAL unit including a prefix SEI message, and wherein the second NAL unit type for the second SEI NAL unit indicates that the second SEI NAL unit comprises a suffix SEI NAL unit including a suffix SEI message;
   decoding video data of the bitstream based on data of the first SEI NAL unit, in accordance with the first SEI NAL unit being the prefix SEI NAL unit, and based on data of the second SEI NAL unit, in accordance with the second SEI NAL unit being the suffix SEI NAL unit, wherein decoding the video data further comprises:

extracting the prefix SEI NAL unit and then extracting first one or more Video Coding Layer (VCL) NAL units from a first access unit including the prefix SEI NAL unit, the first one or more VCL NAL units including a last VCL NAL unit, and the first one or more VCL NAL units succeeding the prefix SEI NAL unit in decoding order in the first access unit; and extracting second one or more VCL NAL units including a last VCL NAL unit and then extracting the suffix SEI NAL unit from a second access unit, wherein the suffix SEI NAL unit succeeds the second one or more VCL NAL units including the last VCL NAL unit in the second access unit in decoding order.

2. A device for decoding video data, the device comprising:

a memory configured to store video data of a bitstream; and a processor configured to:

determine a first value of a first network abstraction layer (NAL) unit type for a first supplemental enhancement information (SEI) NAL unit of a bitstream and a second value of a second NAL unit type for a second SEI NAL unit of the bitstream, wherein the first NAL unit type value for the first SEI NAL unit indicates that the first SEI NAL unit comprises a prefix SEI NAL unit including a prefix SEI message, and wherein the second NAL unit type for the second SEI NAL unit indicates that the second SEI NAL unit comprises a suffix SEI NAL unit including a suffix SEI message;

decode video data of the bitstream based on data of the first SEI NAL unit, in accordance with the first SEI NAL unit being the prefix SEI NAL unit, and based on data of the second SEI NAL unit, in accordance with the second SEI NAL unit being the suffix SEI NAL unit, wherein to decode the video data, the processor is further configured to:

extract the prefix SEI NAL unit and then extracting first one or more Video Coding Layer (VCL) NAL units from a first access unit including the prefix SEI NAL unit, the first one or more VCL NAL units including a last VCL NAL unit, and the first one or more VCL NAL units succeeding the prefix SEI NAL unit in decoding order in the first access unit; and extract second one or more VCL NAL units including a last VCL NAL unit and then extracting the suffix SEI NAL unit from a second access unit, wherein the suffix SEI NAL unit succeeds the second one or more VCL NAL units including the last VCL NAL unit in the second access unit in decoding order.

3. A device for decoding video data, the device comprising:

means for determining a first value of a first network abstraction layer (NAL) unit type for a first supplemental enhancement information (SEI) NAL unit of a bitstream and a second value of a second NAL unit type for a second SEI NAL unit of the bitstream, wherein the first NAL unit type value for the first SEI NAL unit indicates that the first SEI NAL unit comprises a prefix SEI NAL unit including a prefix SEI message, and wherein the second NAL unit type for the second SEI NAL unit indicates that the second SEI NAL unit comprises a suffix SEI NAL unit including a suffix SEI message;

means for video data of the bitstream based on data of the first SEI NAL unit, in accordance with the first SEI NAL unit being the prefix SEI NAL unit, and based on data of the second SEI NAL unit, in accordance with the second SEI NAL unit being the suffix SEI NAL unit, wherein the means for decoding the video data further comprises:

means for extracting the prefix SEI NAL unit and then extracting first one or more Video Coding Layer (VCL) NAL units from a first access unit including the prefix SEI NAL unit, the first one or more VCL NAL units including a last VCL NAL unit, and the first one or more VCL NAL units succeeding the prefix SEI NAL unit in decoding order in the first access unit; and means for extracting second one or more VCL NAL units including a last VCL NAL unit and then extracting the suffix SEI NAL unit from a second access unit, wherein the suffix SEI NAL unit succeeds the second one or more VCL NAL units including the last VCL NAL unit in the second access unit in decoding order.

4. A computer-readable storage medium having stored thereon instructions that, when executed, cause a processor to:

determine a first value of a first network abstraction layer (NAL) unit type for a first supplemental enhancement information (SEI) NAL unit of a bitstream and a second value of a second NAL unit type for a second SEI NAL unit of the bitstream, wherein the first NAL unit type value for the first SEI NAL unit indicates that the first SEI NAL unit comprises a prefix SEI NAL unit including a prefix SEI message, and wherein the second NAL unit type for the second SEI NAL unit indicates that the second SEI NAL unit comprises a suffix SEI NAL unit including a suffix SEI message;

decode video data of the bitstream based on data of the first SEI NAL unit, in accordance with the first SEI NAL unit being the prefix SEI NAL unit, and based on data of the second SEI NAL unit, in accordance with the second SEI NAL unit being the suffix SEI NAL unit, wherein the instructions that cause the processor to decoding the video data further comprise instructions that cause the processor to:

extract the prefix SEI NAL unit and then extracting first one or more Video Coding Layer (VCL) NAL units from a first in an access unit including the prefix SEI NAL unit, the first one or more VCL NAL units including a last VCL NAL unit, and the first one or more VCL NAL units succeeding the prefix SEI NAL unit in decoding order in the first access unit; and extract second one or more VCL NAL units including a last VCL NAL unit and then extracting the suffix SEI NAL unit from a second access unit, wherein the suffix SEI NAL unit succeeds the second one or more VCL NAL units including the last VCL NAL unit in the second access unit in decoding order.

5. A method of generating a bitstream including video data, the method comprising:

encoding a first supplemental enhancement information (SEI) message comprising a prefix SEI message and a second SEI message comprising a suffix SEI message, wherein the prefix SEI message and the suffix SEI message each includes data related to encoded video data;

encapsulating the prefix SEI message in a first SEI network abstraction layer (NAL) unit;

setting a first NAL unit type value for the first SEI NAL unit to a value that indicates that the first SEI NAL unit is a prefix SEI NAL unit;

forming a first access unit such that the first access unit includes the first SEI NAL unit succeeded by a last Video Coding Layer (VCL) NAL unit in decoding order;

encapsulating the suffix SEI message in a second SEI NAL unit;

setting a second NAL unit type value for the second SEI NAL unit to a value that indicates that the second SEI NAL unit is a suffix SEI NAL unit;

forming a second access unit such that the second access unit includes one or more VCL NAL units including a last VCL NAL unit succeeded by the suffix SEI NAL unit in decoding order such that the suffix SEI NAL unit follows all of the VCL NAL units in the second access unit in decoding order; and generating a bitstream including at least the first access unit and the second access unit.

6. A device for generating a bitstream including video data, the device comprising a processor configured to:

encode a first supplemental enhancement information (SEI) message comprising a prefix SEI message and a second SEI message comprising a suffix SEI message, wherein the prefix SEI message and the suffix SEI message each includes data related to encoded video data;

encapsulate the prefix SEI message in a first SEI network abstraction layer (NAL) unit;

set a first NAL unit type value for the first SEI NAL unit to a value that indicates that the first SEI NAL unit is a prefix SEI NAL unit;

a first access unit such that the first access unit includes the first SEI NAL unit succeeded by a last Video Coding Layer (VCL) NAL unit in decoding order;

encapsulate the suffix SEI message in a second SEI NAL unit;

set a second NAL unit type value for the second SEI NAL unit to a value that indicates that the second SEI NAL unit is a suffix SEI NAL unit;

form a second access unit such that the second access unit includes one or more VCL NAL units including a last VCL NAL unit succeeded by the suffix SEI NAL unit in decoding order such that the suffix SEI NAL unit follows all of the VCL NAL units in the second access unit in decoding order; and generate a bitstream including at least the first access unit and the second access unit.

7. A device for generating a bitstream including video data, the device comprising:

means for encoding a first supplemental enhancement information (SEI) message comprising a prefix SEI message and a second SEI message comprising a suffix SEI message, wherein the prefix SEI message and the suffix SEI message each includes data related to encoded video data;

means for encapsulating the prefix SEI message in a first SEI network abstraction layer (NAL) unit;

means for setting a first NAL unit type value for the first SEI NAL unit to a value that indicates that the first SEI NAL unit is a prefix SEI NAL unit;

means for forming a first access unit such that the first access unit includes the first SEI NAL unit succeeded by a last Video Coding Layer (VCL) NAL unit in decoding order;

encapsulating the suffix SEI message in a second SEI NAL unit;

setting a second NAL unit type value for the second SEI NAL unit to a value that indicates that the second SEI NAL unit is a suffix SEI NAL unit;

means for forming a second access unit such that the second access unit includes one or more VCL NAL units including a last VCL NAL unit succeeded by the suffix SEI NAL unit in decoding order such that the suffix SEI NAL unit follows all of the VCL NAL units in the second access unit in decoding order; and means for generating a bitstream including at least the first access unit and the second access unit.

8. A computer-readable storage medium having stored thereon instructions that, when executed, cause a processor to:

encode a first supplemental enhancement information (SEI) message comprising a prefix SEI message and a second SEI message comprising a suffix SEI message, wherein the prefix SEI message and the suffix SEI message each includes data related to encoded video data;

encapsulate the prefix SEI message in a first SEI network abstraction layer (NAL) unit;

set a first NAL unit type value for the first SEI NAL unit to a value that indicates that the first SEI NAL unit is a prefix SEI NAL unit;

form a first access unit such that the first access unit includes the first SEI NAL unit succeeded by a last Video Coding Layer (VCL) NAL unit in decoding order;

encapsulate the suffix SEI message in a second SEI NAL unit;

set a second NAL unit type value for the second SEI NAL unit to a value that indicates that the second SEI NAL unit is a suffix SEI NAL unit;

form a second access unit such that the second access unit includes one or more VCL NAL units including a last VCL NAL unit succeeded by the suffix SEI NAL unit in decoding order such that the suffix SEI NAL unit follows all of the VCL NAL units in the second access unit in decoding order; and generate a bitstream including at least the first access unit and the second access unit.

9. The device of claim 2, wherein the device comprises at least one of:

one or more integrated circuits;
one or more microprocessors;
one or more digital signal processors (DSPs);
one or more field programmable gate arrays (FPGAs);
a desktop computer;
a laptop computer;
a tablet computer;
a phone;
a television;
a camera;
a display device;
a digital media player;
a video game console;
a video game device;
a video streaming device; or
a wireless communication device.

10. The device of claim 2, further comprising a display device that is configured to display at least a portion of the video data.

11. The device of claim 3, wherein the device comprises at least one of:
- one or more integrated circuits;
- one or more microprocessors;
    - one or more digital signal processors (DSPs);
    - one or more field programmable gate arrays (FPGAs);
    - a desktop computer;
    - a laptop computer;
    - a tablet computer;
    - a phone;
    - a television;
    - a camera;
    - a display device;
    - a digital media player;
    - a video game console;
    - a video game device;
    - a video streaming device; or
    - a wireless communication device.

12. The device of claim 3, further comprising display means for displaying at least a portion of the video data.

* * * * *